United States Patent
Unno

(10) Patent No.: US 9,635,568 B2
(45) Date of Patent: Apr. 25, 2017

(54) RADIO ACCESS SYSTEM AND RADIO CONTROL APPARATUS

(71) Applicant: FUJITSU LIMITED, Kawasaki-shi, Kanagawa (JP)

(72) Inventor: Masataka Unno, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 14/564,417

(22) Filed: Dec. 9, 2014

(65) Prior Publication Data

US 2015/0163684 A1 Jun. 11, 2015

(30) Foreign Application Priority Data

Dec. 10, 2013 (JP) .................................. 2013-255051

(51) Int. Cl.
| | |
|---|---|
| H04W 24/04 | (2009.01) |
| H04W 24/08 | (2009.01) |
| H04W 52/02 | (2009.01) |
| H04W 24/02 | (2009.01) |
| H04W 88/08 | (2009.01) |

(52) U.S. Cl.
CPC ........... *H04W 24/04* (2013.01); *H04W 24/02* (2013.01); *H04W 24/08* (2013.01); *H04W 52/0206* (2013.01); *H04W 88/085* (2013.01); *Y02B 60/50* (2013.01)

(58) Field of Classification Search
CPC ..... H04W 24/08; H04W 24/00; H04W 24/02; H04W 24/04; H04W 24/10; H04W 88/085; H04W 88/04; H04W 88/08; H04W 88/12; H04W 88/14; H04W 88/16; H04W 16/00; H04W 16/04; H04W 16/10; H04W 16/14; H04W 16/16; H04W 16/18; H04W 16/24; H04W 28/00; H04W 28/0221; H04W 28/0231; H04W 28/0236; H04W 28/0268; H04W 52/0206; Y02B 60/50
USPC .................................................. 455/524.525
See application file for complete search history.

(56) References Cited

U.S. PATENT DOCUMENTS

| | | | |
|---|---|---|---|
| 2003/0195019 A1* | 10/2003 | Litwin | H04M 1/72505 455/574 |
| 2009/0005043 A1* | 1/2009 | Claussen | H04W 24/02 455/436 |
| 2010/0017511 A1* | 1/2010 | Kim | H04L 12/66 709/225 |
| 2012/0027030 A1* | 2/2012 | Naito | G01V 1/22 370/503 |
| 2012/0172083 A1* | 7/2012 | Logalbo | H04W 8/186 455/525 |

(Continued)

FOREIGN PATENT DOCUMENTS

JP 05-259967 10/1993

*Primary Examiner* — Erica Navar
(74) *Attorney, Agent, or Firm* — Fujitsu Patent Center

(57) ABSTRACT

A radio access system including a plurality of radio apparatuses each configured to form a cell, and a radio control apparatus to control the plurality of radio apparatuses. The radio control apparatus includes a controller configured to execute processes including monitoring the plurality of radio apparatus, selecting, from within the plurality of radio apparatuses, a radio apparatus operating with a large zone cell mode to form a large zone cell being larger than the cell when a monitoring result satisfies a predetermined condition, and switching over the selected radio apparatus to the large zone cell mode.

12 Claims, 22 Drawing Sheets

(56) References Cited

U.S. PATENT DOCUMENTS

| | | | | |
|---|---|---|---|---|
| 2013/0165084 A1* | 6/2013 | Xu | ............... | H04W 4/003 |
| | | | | 455/414.1 |
| 2014/0050483 A1* | 2/2014 | Berlin | ............... | H04B 7/2606 |
| | | | | 398/115 |
| 2014/0155078 A1* | 6/2014 | Balageas | ............... | H04W 24/02 |
| | | | | 455/452.1 |
| 2014/0293772 A1* | 10/2014 | Ogura | ............... | H04W 24/04 |
| | | | | 370/221 |
| 2015/0264582 A1* | 9/2015 | Brighenti | ............... | H04W 16/08 |
| | | | | 455/446 |

* cited by examiner

RADIO ACCESS SYSTEM AND RADIO CONTROL APPARATUS

CROSS-REFERENCE TO RELATED APPLICATION

This application is based upon and claims the benefit of priority of the prior Japanese Patent Application No. 2013-255051, filed on Dec. 10, 2013, the entire contents of which are incorporated herein by reference.

FIELD

Disclosure relates to a radio access system and a radio control apparatus.

As a related technology, there is a technology that a plurality of subordinate radio base stations are disposed around a master radio base station and the master radio base station expands a speech zone so that speech zones of the plurality of subordinate radio base stations are covered when a failure occurs in any one of the plurality of subordinate radio base stations.

Further, in the field of mobile communications, as one example of the base station apparatus forming a radio access system, there is abase station apparatus including a plurality of radio apparatus and a radio control apparatus to control each of the plurality of radio apparatus. For example, in Long Term Evolution (LTE) defined as a radio access standard being standardized in 3GPP and LTE-Advanced (LTE-A), the following base station apparatus (radio base station: called eNode B (evolved Node B) (eNB)) exists. To be specific, the base station apparatus includes a radio control apparatus called a Radio Equipment Control (REC) and a plurality of radio apparatus (called Radio Equipment (RE)), each of which is connected to the radio control apparatus and forms a cell. The REC apparatus and each of the plurality of RE apparatuses are connected via a link utilizing, e.g., a Common Public Radio Interface (CPRI) defined as one of standard specifications for an internal interface of radio base stations. Note that the REC is called a Base Band Unit (BBU), and the RE is called a Remote Radio Head (RRH) in some cases.

For more information, see Japanese Laid-Open Patent Publication No. 05-259967.

The related technology involves expanding the speech zone of a predetermined master radio base station. Similarly to this contrivance, it is considered that a specific RE apparatus operating in a large zone cell mode to form a "large zone cell" larger than a normal cell under a predetermined condition is predetermined from within the plurality of RE apparatuses. For example, when a failure of a certain RE apparatus occurs, the specific RE apparatus is switched over to the large zone cell mode to form the large zone cell.

However, the method of predetermining the specific RE apparatus operating with the large zone cell mode has a problem that the large zone cell is not formed when a failure of the specific RE apparatus occurs.

SUMMARY

One of embodiments of the invention is a radio access system including a plurality of radio apparatuses each configured to form a cell, and a radio control apparatus to control the plurality of radio apparatuses. The radio control apparatus includes a controller configured to execute processes including monitoring the plurality of radio apparatus, selecting, from within the plurality of radio apparatuses, a radio apparatus operating with a large zone cell mode to form a large zone cell being larger than the cell when a monitoring result satisfies a predetermined condition, and switching over the selected radio apparatus to the large zone cell mode.

The target and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of the present invention will hereinafter be described with reference to the drawings. A configuration of the embodiment is an exemplification, and the present invention is not limited to the configuration of the embodiment.

<System Architecture>

Figure 1:
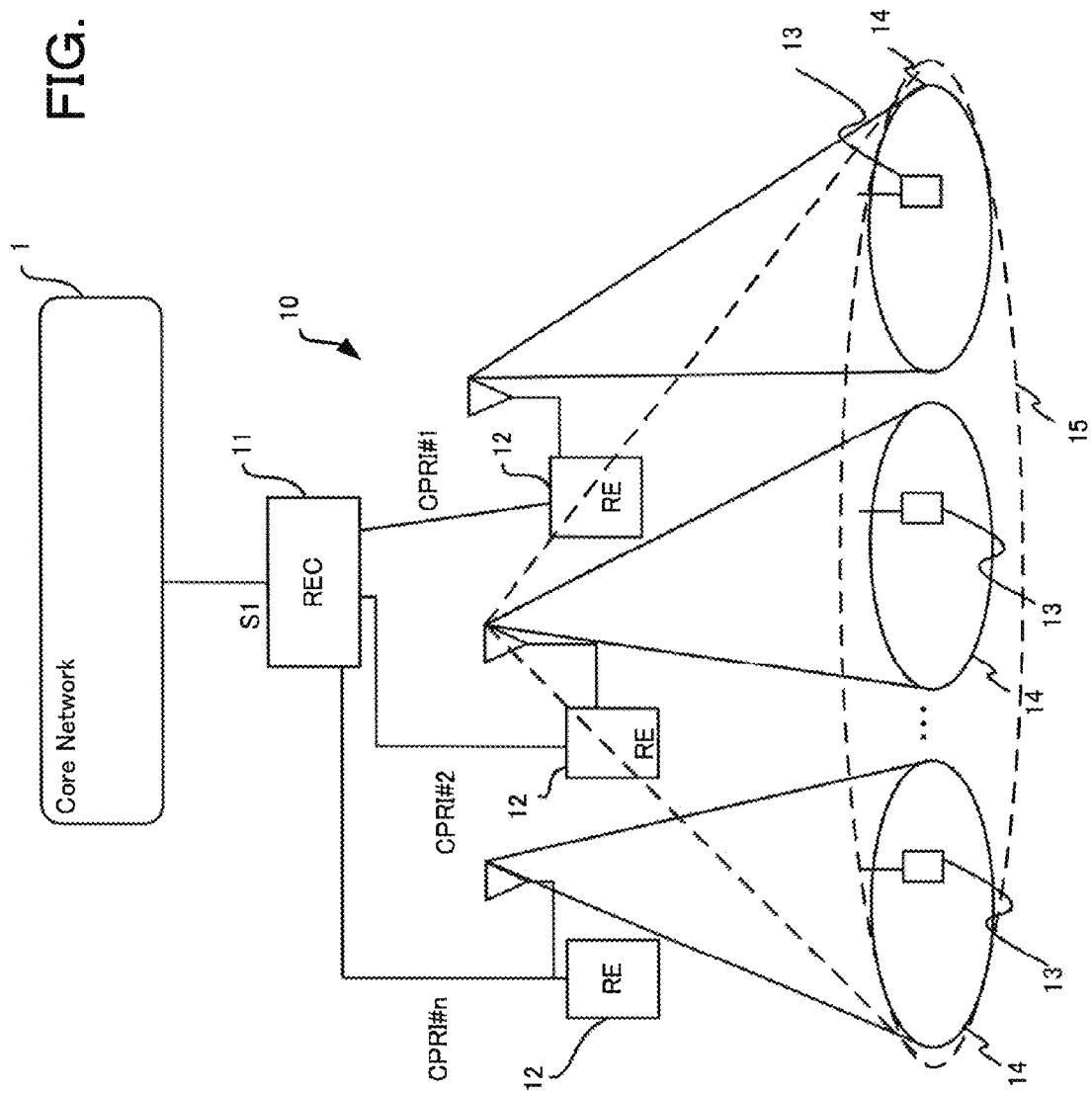
FIG. 1 illustrates an example of a radio access system (radio communication system) according to an embodiment.

FIG. 1 illustrates an example of a radio access system according to the embodiment. An example of system architecture supporting to LTE and/or LTE-A is given by way of one example of the radio access system. FIG. 1 illustrates a base station apparatus 10 connected to a core network 1 (called an Evolved Packet Core (EPC) or a System Architecture Evolution (SAE)).

The base station apparatus 10 includes a Radio Equipment Control (REC) apparatus 11 (which will hereinafter be abbreviated to REC 11) and a plurality of Radio Equipment (RE) apparatuses 12 (which will hereinafter be abbreviated to REs 12) controlled by the REC 11. The REC 11 is connected to the core network 1 via an S1 line. Further, the REC 11 is connected to each of the REs 12 via, e.g., CPRI links (CPRI cables). A number n of the REs 12 is selected as a proper number from positive integers each being larger than "1". FIG. 1 illustrates three pieces (n=3) of RE 12.

The plurality of REs 12 is one example of "plural pieces of radio apparatus", and the REC 11 is one example of "a radio control apparatus to control a plurality of radio apparatus". The CPRI link is one example of "a transmission path between the radio control apparatus and the radio apparatus".

The REC 11 executes a digital baseband signal (BB signal) process, a terminating process of the S1 line used for connecting with the core network 1, and a terminating process of an X2 line used for connecting with a neighboring base station apparatus (unillustrated). Further, the REC 11 executes a call process and a monitor control process. Still further, the REC 11 modulates a packet (e.g., an Internet Protocol (IP) packet) received from the core network 1 into the BB signal, and transmits the BB signal to the RE 12 associated with a destination of the packet. The REC 11 demodulates the BB signal received from each RE 11, and transmits the packet to the core network 1.

The RE 12 forms a cell 14 used to perform a wireless communication with a radio terminal (called User Equipment (UE)) 13, thereby the RE 12 performs the wireless communication with the subordinate UE 13 existing in the cell 14. The RE 12 converts the BB signal received from the REC 11 into a radio wave, and transmits the radio wave to the UE 13. Moreover, the RE 12 converts the radio wave received from the UE 13 into the BB signal, and transmits the BB signal to the REC 11.

Each RE 12 may form a large zone cell 15 which has a cell radius being larger than a cell radius of the cell 14 formed when in a normal status. Each RE 12 operates in a plurality modes including at least a mode to form the cell 14 (normal cell) (which will be termed a normal mode) and a large zone cell mode to form the large zone cell 15. Switchover of the mode is controlled by the REC 11. For example, each RE 12 may form the large zone cell 15 having a cell radius with a size covering at least a part (segment) of the cell 14 (normal cell) formed by the other REs 12.

In the base station apparatus 10, the REs 12 are monitored, and, when a monitoring result satisfies a predetermined condition, the RE 12 operating with the large zone cell mode is dynamically selected from among the REs 12. For example, the REC 11 monitors a status (normal/abnormal) of each of the REs 12 and, when the number of the REs 12 indicating (having) the normal status reaches a predetermined range, the REC 11 dynamically selects the RE 12 to be switched over to the large zone cell mode from within the REs 12 having the normal status. Then, the REC 11 switches over the mode of the selected RE 12 to the large zone cell mode. For instance, as a switchover target to the large zone cell mode, the REC 11 may select the RE 12 capable of covering at least apart of the cell 14 (normal cell) formed by the RE 12 having the abnormal status from among the other REs 12 having the normal status.

The base station apparatus 10 may be a base station apparatus using a single frequency band and may also be a base station apparatus using a plurality of frequency bands. when the plurality of frequency bands is used, the base station apparatus 10 may include a plurality of REs 12, each of which uses anyone of the plurality of frequency bands. However, one RE 12 uses two or more frequency bands as the case may be.

Further, the base station apparatus 10 may support one radio access method and may also support a plurality of radio access methods. For example, the base station apparatus 10 may also be abase station apparatus that supports not only the LTE or LTE-A method but also 3G (e.g., W-CDMA (Wideband Code Division Multiple Access) method). The REC of the base station apparatus supporting 3G (W-CDMA) as well as LTE or LTE-A is called "a shared REC". The shared REC has functions of both of a base station apparatus (Base Transceiver Station (BTS) in 3G and abase station apparatus (eNodeB: evolved Node B) in LTE or LTE-A.

<Configuration of REC>

Figure 2:
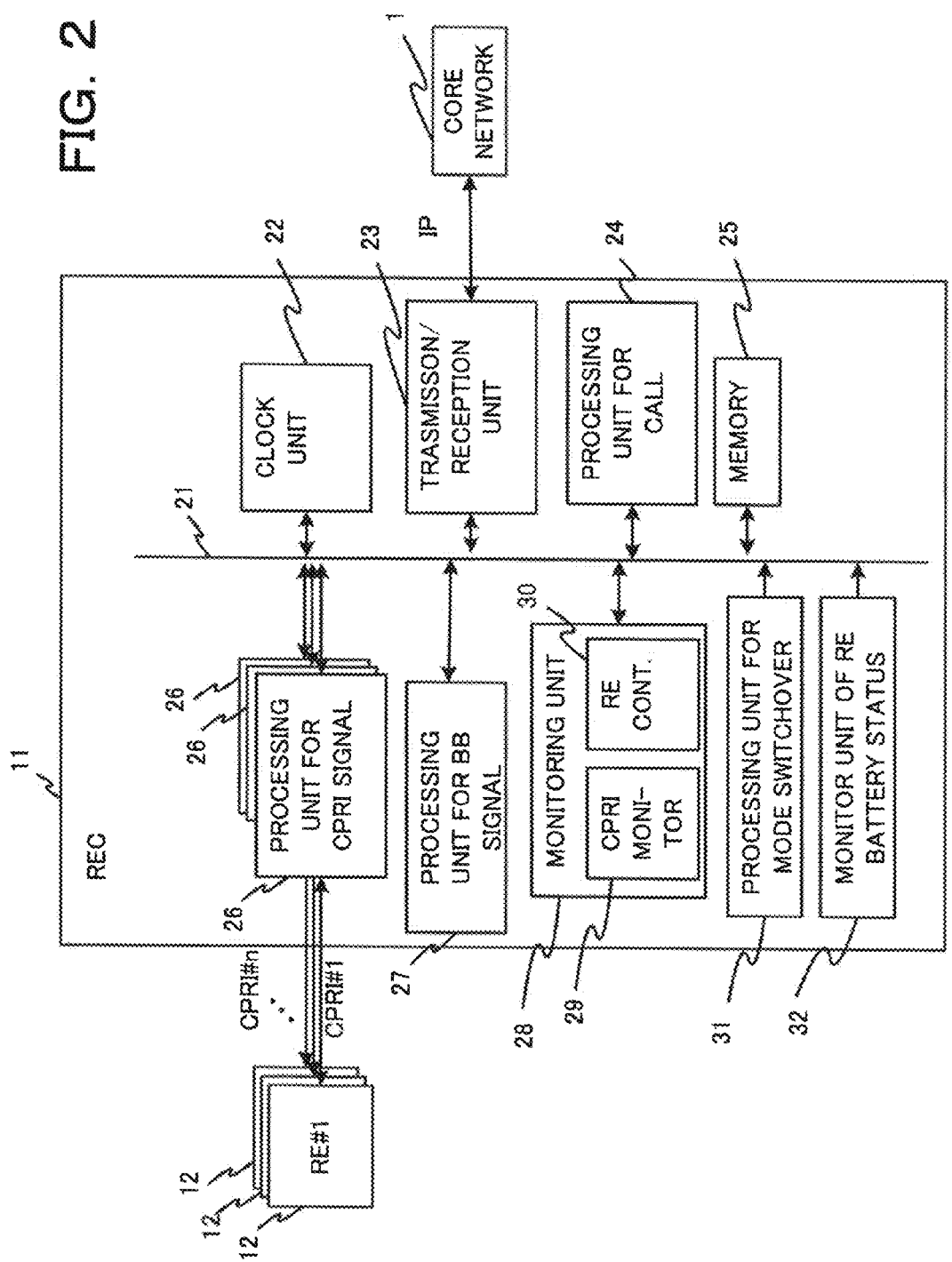
FIG. 2 is a diagram illustrating an example of a configuration of a REC.

FIG. 2 is a diagram illustrating an example of a configuration of the REC 11. In FIG. 2, the REC 11 includes a clock unit 22, a transmission/reception unit 23 of a network side and a processing unit 24 for call. These units 22, 23 and are interconnected via an intra-apparatus switch 21 (hereinafter referred to as "SW 21"). The REC 11 further includes a memory 25 for storing data, a plurality of (n pieces of) CPRI signal processing units 26 and a BB signal processing unit 27, each of which is interconnected via the SW 21.

The REC 11 still further includes a monitoring unit 28 connected to the SW 21. The monitoring unit 28 includes a monitoring unit 29 for a CPRI connection status and an antenna control unit 30. The REC 11 yet further includes a processing unit 31 for mode switchover and an RE battery status monitoring unit 32, which are connected to the SW 21.

The clock unit 22 supplies a reference clock to units within the REC 11. The network side transmission/reception unit 23 is connected via the S1 line to the core network 1. The network side transmission/reception unit 23 performs, e.g., a protocol process on an IP layer, an S1/X2 line terminating process, a band control process, etc.

The network side transmission/reception unit 23 distinguishes whether the IP packet received from the core network 1 is an IP packet (user packet) on a user plane (U plane) or a packet (containing a control signal) on a control plane (C plane). The user packet is sent via the SW 21 to the BB signal processing unit 27. The control signal is sent via the SW 21 to the call processing unit 24 and the monitoring unit 28. The network side transmission/reception unit 23 sends the user packet received via the SW 21 from the BB signal processing unit 27 and the control signals received via the SW 21 from the call processing unit 24 and the monitoring unit 28 to the core network 1.

The core network 1 includes, though not illustrated, a Mobility Management Entity (MME) handling the C plane, a Serving Gateway (S-GW) dealing with the user packet and a Packet Data Network Gateway (P-GW). The MME is an access gateway of the C plane, which handles network control, and executes sequence control, handover control, position management (registration of the position of the RE of the RE when in a standby status, calling (paging) for the base station apparatus when a call arrives, authentication of the RE (NAS (Non Access Stratum)) and so on. The S-GW is the gateway dealing with the user data (user packet), and executes a process of connecting the user data of LTE to a 2G (e.g., GSM (Global System for Mobile communications) system or a 3G (W-CDMA) system. The P-GW is a gateway for connecting the user packet to an external network such as the external Internet and an Intranet. The P-GW performs data collection for accounting, Quality of Service (QoS) control and packet filtering.

The call processing unit 24 conducts, for example, call control such as a call connection and a call disconnection of a user (UE 13) based on RRC (Radio Resource Control). The call processing unit 24 also conducts management of statuses such as a connection status and an idle status.

The memory 25 is a nonvolatile memory and is stored with a program for controlling the whole base station apparatus 10 and also data used when executing the program. For example, the memory 25 can be stored with the data used by the call processing unit 24, the CPRI signal processing unit 26, the BB signal processing unit 27, the monitoring unit 28, the mode switchover processing unit 31 and the RE battery status monitoring unit 32. The data include, e.g., data (station data) of the base station apparatus 10.

The BB signal processing unit 27 converts the user packet into the BB signal and vice versa (modulation/demodulation). To be specific, the BB signal processing unit 27 carries out respective protocol processes of Layer 1 (L1:PHY) and Layer 2 (L2). The protocol of Layer 2 includes, e.g., RCL (Radio Link Control), PDCP (Packet Data Convergence Protocol) and MAC (Media Access Control).

The BB signal processing unit 27 executes digital baseband processes such as a MIMO (Multiple-Input and Multiple-Output) process, an OFDMA (Orthogonal Frequency-Division Multiplexing) process toward a downlink, an SC-FDMA (Single-Carrier Frequency-Division Multiple Access) process from an uplink, an H-ARQ (Hybrid Automatic Repeat reQuest) process, an AMC (Adaptive Modulation and Coding) process, power control and an inter cell interference control.

Each CPRI signal processing unit 26 converts the BB signal received via the SW 21 from the BB signal processing unit 27 and the control signals received via the SW 21 from the call processing unit 24 and the monitoring unit 28 into a signal forma (CPRI signal) conforming to the CPRI. Each CPRI signal processing unit 26 transmits the CPRI signal to the RE 12 (associated RE) connected via the CPRI link (CPRI cable).

Further, each CPRI signal processing unit 26 converts the CPRI signal containing the user data received from the associated RE into the BB signal, and transmits the BB signal to the BB signal processing unit 27. Alternatively, the CPRI signal processing unit 26 transmits the control signal obtained through the conversion of the CPRI signal received from the associated RE to the call processing unit 24 and the monitoring unit 28.

Note that the CPRI is exemplified as an interface (internal interface) between the REC and the RE, the interface establishing a connection between the REC 11 and each RE 12, and an internal interface other than CPRI may also be applied.

The monitoring unit 28 collects pieces of failure information from the function units, an equipment failure monitoring process, and so forth. The CPRI signal processing unit 26 monitors a status (normal/abnormal) of the CPRI link interconnecting each RE 12 and the REC 11 for CPRI connection status information. The CPRI connection status monitoring unit 29 can store (retain) information (status information) indicating the status (normal/abnormal) of each RE 12.

A physical or logical failure (link failure) of the CPRI link and a communication failure based on the link failure are detected as CPRI connection statuses. A determination of being "normal/abnormal" based on the CPRI connection status is an exemplification. The monitoring unit 28 can detect, e.g., an equipment failure and a software error of each RE 12 as the failures other than the CPRI link statuses. Accordingly, the "abnormal" status can be stored as the status of the RE 12 from which at least one of the link failure, the communication failure, the equipment failure and the software error is detected. Types of the failures used for the determination as to whether normal or abnormal can be properly selected. The antenna control unit 30 transmits, to each RE 12, an instruction to control a direction of the antenna provided in each RE 12.

The mode switchover processing unit 31 switches over the mode of each RE 12. The mode switchover processing unit 31 can perform the switchover leastwise from the "normal mode" in which each RE 12 forms the normal cell 14 to the "large zone cell mode" in which to form the large zone cell 15. The mode switchover processing unit 31 monitors the number of the REs 12 (normal REs 12) each of which indicates the normal status by use of the status information of each of the REs 12. Further, the mode switchover processing unit 31 determines a start of the switchover process to the large zone cell mode, selects the RE 12 to be switched over to the large zone cell mode, and executes the switchover to the large zone cell mode.

The RE battery status monitoring unit 32 monitors the battery status of each RE 12. The battery status includes a power status indicating which source, a normal power source 61 or a battery 62, is used by the RE 12 (use/non-use of the battery 62), and a battery remaining capacity indicating a remaining capacity of the battery 62. The RE battery status monitoring unit 32 monitors the battery status of each RE 12. The monitoring is conducted by employing the battery status received from each RE 12. The RE battery status monitoring unit 32 stores (retains) the battery status of each of the REs 12.

<<Hardware Configuration of REC>>

Figure 3:
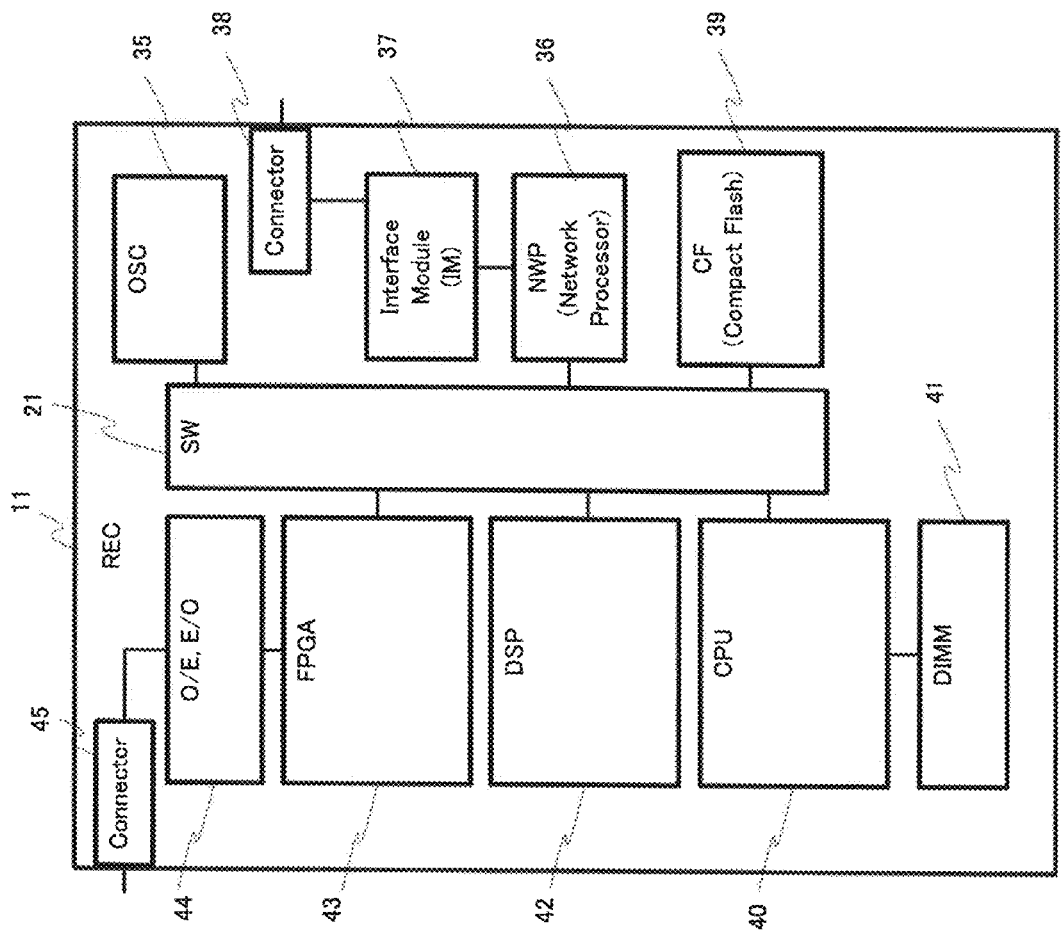
FIG. 3 is a diagram illustrating an example of a hardware configuration of the REC.

FIG. 3 is a diagram illustrating an example of a hardware configuration of the REC 11. In FIG. 3, the REC 11 includes the SW 21, an oscillation circuit (oscillator: OSC) 35 connected to the SW 21, and a network processor (NWP) 36. The NWP 36 is connected to an interface module (IM) 37, and the IM 37 is connected to a connector 38. The connector 38 receives a physical link for establishing a connection with the core network 1.

Further, a compact flash (CF) 39, a Central Processing Unit (CPU) 40, a Digital Signal Processor (DSP) 42 and a Field Programmable Gate Array (FPGA) 43 are connected to the SW 21. A Dual Inline Memory Module (DIMM) 41 is connected to the CPU 40. An optical module (O/E, E/O) 44 is connected to the FPGA 43. A connector 45 is connected to the optical module 44. The connector 45 receives a physical link (optical fiber) connected to the RE 12.

The OSC 35 functions as a clock unit 22 illustrated in FIG. 2, and oscillates a reference clock. The NWP 36, the IM 37 and the connector 38 function as the network side transmission/reception unit 23 depicted in FIG. 2. The NWP 36 executes the protocol process of the IP layer and the band control process. The IM 37 is an interface circuit to convert the signal.

The CF 39 is one example of the nonvolatile memory functioning as the memory 25. Nonvolatile memories (e.g., a hard disk, a flash memory) and SSDs (Solid Status Drives) other than the CF can be applied as the memory 25.

The DIMM 41 is one example of a memory (a main storage device) for the CPU 40. For example, a DIMM based SDRAM (Synchronous DRAM) is applied as the DIMM 41. However, e.g., a RAM/ROM (Random Access Memory/Read Only Memory) can be applied as the main storage device. The DIMM 41 and the memory 25 (CF 39) are given by way of one example of a storage device or a storage medium.

The CPU 40 loads the program stored on the CF 39 into the DIMM 41 and executes this program. The CPU 40, thereby, functions as the call processing unit 24, the monitoring unit 28, the mode switchover processing unit 31 and the RE battery status monitoring unit 32, which are illustrated in FIG. 2. The DSP 42 functions, upon executing the program, as the BB signal processing unit 27 depicted in FIG. 2. The CPU 40 and the DSP 42 are given by way of one example of a "processor", "controller" or a "control device".

The FPGA 43, the optical module 44 and the connector 45 function as the CPRI signal processing unit 26 illustrated in FIG. 2. The FPGA 43 converts the BB signal (radio IQ data) received from the DSP 42 into the CPRI signal, or converts the CPRI signal received from the optical module 44 into the BB signal. The FPGA 43 is one example of the "controller" or "control device".

The optical module 44 performs an electric-optic (photoelectric) conversion (E/O) to convert a CPRI signal format into an optical signal from an electric signal, and an optoelectric conversion (O/E) to convert the optical signal into the electric signal. The connector 45 receives the optical fiber exemplified as the physical link.

Note that FIG. 3 depicts the FPGA 43, the optical module 44 and the connector 45 as a 3-tuple by way of an example, however, the 3-tuple of these components may also be provided per RE 12. It may happen that the number of the DSPs 42 functioning as the BB signal processing unit 27 becomes "2" or larger corresponding to the number of the REs 12.

The functions (the call processing unit 24, the monitoring unit 28, the mode switchover processing unit 31 and the RE battery status monitoring unit 32 in FIG. 2) executed by the CPU 40 of the REC 11 illustrated in FIG. 3 may also be implemented by a hardware logic using an electric/electronic circuit and a semiconductor device. In other words, the "control device" implemented by use of the processor and the memory may also be a device implemented by using the hardware.

The semiconductor device includes, e.g., a programmable device (PLD) such as the FPGA, and an integrated circuit (IC, LSI, ASIC (Application Specific Integrated Circuit), etc.). The semiconductor device may include a combination of the PLD, the integrated circuit and the electric/electronic circuit. A plurality of functions possessed by the CPU 40 may be implemented by use of plural pieces of hardware and may also be executed by using a plurality of processors. The function (the BB signal processing unit 27) implemented by employing the DSP 42 can be also implemented by the hardware using the semiconductor device etc. The function (the CPRI signal processing unit 26) implemented by using the FPGA 43 can be implemented by the hardware using the semiconductor device etc. other than the FPGA.

<Example of Configuration of RE>

Figure 4:
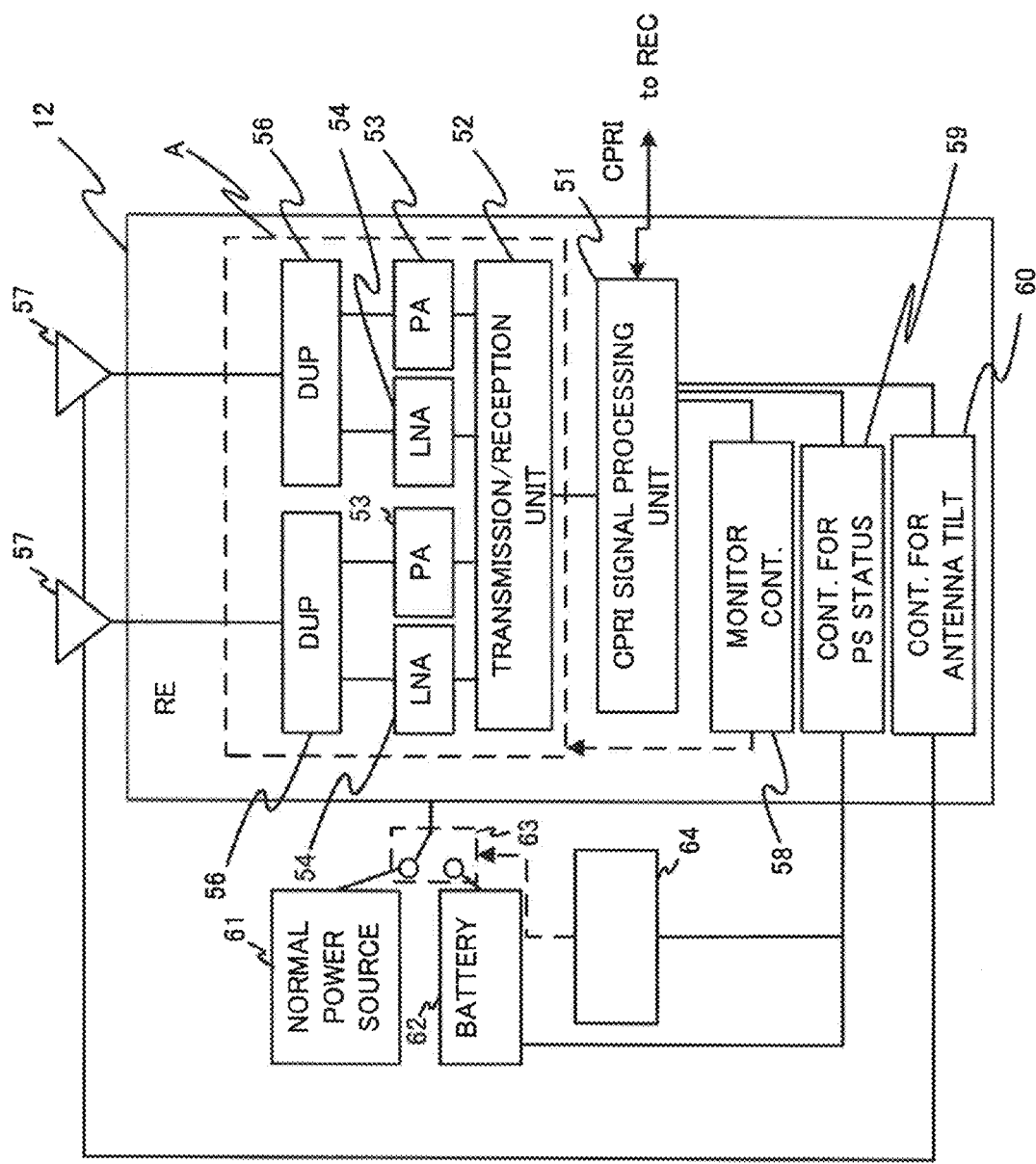
FIG. 4 is a diagram illustrating an example of a configuration of RE.

FIG. 4 is diagram illustrating an example of a configuration of the RE 12. The RE 12 transmits and receives the BB signal (radio IQ data) and the control signal to and from the REC 11 on the CPRI (the internal interface). Further, the RE 12 performs the wireless communication with the UE 13.

In FIG. 4, the RE 12 includes a CPRI signal processing unit 51 connected to the CPRI link, a transmission/reception unit 52 connected to the CPRI signal processing unit 51, and a monitor control unit (monitor controller) 58.

The RE 12 receives the CPRI signal, i.e., the BB signal (radio IQ data) taking the CPRI signal format and the control signal from the REC 11. The CPRI signal processing unit 51 restores the BB signal and the control signal received from the REC 11 back to the original format. The BB signal obtained through the conversion of the signal format is transmitted to the transmission/reception unit 52. On the other hand, the control signal obtain through the conversion of the signal format is transmitted to the monitor control unit 58.

Further, the CPRI signal processing unit 51 converts the BB signal received from the transmission/reception unit 52 and the control signal received from the monitor control unit 58 into the CPRI signals, respectively. The CPRI signals are transmitted to the REC 11 via the CPRI link.

An antenna array formed by a plurality of antenna units is connected to the transmission/reception unit 52. FIG. 4 illustrates the two antenna units. Each antenna unit executes a process related to a downlink signal which is a signal a downlink direction (from a base station to a UE) and a process related to an uplink signal which is a signal of an uplink direction (from a UE to a base station).

The antenna unit includes a power amplifier (PA) 53, a low noise amplifier (LNA) 54 each connected to the transmission/reception unit 52, a duplexer (DUP) 56 receiving connections of the PA 53 and the LNA 54, and an antenna/reception antenna 57 connected to the DUP 56.

The transmission/reception unit 52 carries out an orthogonal modulation/demodulation process. To be specific, the transmission/reception unit 52 converts the BB signal (downlink signal) from the CPRI signal processing unit 51 into an analog signal (RF (Radio Frequency) signal) through orthogonal modulation, and transmits the analog signal toward the PA 53. Further, the transmission/reception unit 52 converts the RF signal (uplink signal) received from the LNA 54 into the BB signal through orthogonal demodulation, and transmits the BB signal to the CPRI signal processing unit 51.

The PA 53 amplifies the downlink signal (radio wave) and supplies the amplified signal to the DUP 56. The DUP 56 transmits the downlink signal (radio wave) amplified by the PA to the transmission/reception antenna 57. The transmission/reception antenna 57 radiates the radio waves. The ratio waves are received by the UE 13. Further, the transmission/reception antenna 57 receives the radio waves from the UE 13. The received radio waves are transmitted by the DUP 56 to the LNA 54. The LNA 54 causes the radio waves to undergo the low noise amplification and transmits the amplified radio waves to the transmission/reception unit 52.

Moreover, the RE 12 includes the monitor control unit (controller for monitoring) 58 connected to the CPRI signal processing unit 51, a power source status monitoring unit (controller for power source status) 59 and an antenna tilt control unit (controller for antenna tilt) 60. The RE 12 further includes a normal power source 61, a battery 62, a switch 63 and a power source switchover control unit (controller for switching over power source) 64.

The normal power source 61 is a primary power source for supplying units included in the RE 12 with operation power for the RE 12. The battery 62 is a secondary power source for supplying units included in the RE 12 with the operation power when the RE cannot utilize the power from the normal power source 61. The switch 63 connects power supply lines leading to units included in the RE 12 to one of the normal power source 61 and the battery 62. The switch 63 may also be any one of, e.g., a mechanical switch, a relay and a semiconductor switch.

The power source switchover control unit 64 is a control circuit to control the switchover between the normal power source 61 and the battery 62 by controlling the switch 63. The power source switchover control unit 64 switches the power source of the RE 12 to the battery 62 from the normal power source 61 by controlling a switchover operation of the switch 63 when, e.g., the normal power source 61 becomes abnormal.

The monitor control unit 58 performs, when receiving the control signal indicating the switchover to, e.g., a power save mode, the switchover to the power save mode. The power save mode involves reducing a quantity of power supply or stopping the power supply to a predetermined power save control range A.

In an example illustrated in FIG. 4, the power save control range A covers the transmission/reception unit 52, the PA 53, the LNA 54 and the DUP 56 (which may be sometimes (generically) called an "RF unit"). In the power save mode, such a status occurs that the cell is not formed by the RE 12 by reducing the quantity of power supply or stopping the power supply to the power save control range A.

The power source status monitoring unit 59 is connected to the power source switchover control unit 64 and the battery 62. The power source status monitoring unit 59 monitors, e.g., a status of the power source switchover control unit 64, and also monitors the power status of the RE 12. Moreover, the power source status monitoring unit 59 monitors the remaining capacity (battery remaining capacity) of the battery 62. The power status and the battery remaining capacity are transmitted as information indicating the battery status to the REC 11.

The antenna tilt control unit 60 controls an antenna tilt (which is also referred to as a beam tilt). The antenna tilt control unit 60 controls the antenna tilt on the basis of the control signal coming from the REC 11 that receives the control signal from the CPRI signal processing unit 51.

The antenna tilt control unit 60 controls, by a so-called "electric tilt" method, phases of the radio waves in a plurality of antenna elements (the plurality of transmission/reception antennas 57) forming the antenna array. The phases of the radio waves are controlled, thereby controlling an angle of the beam tilt (antenna tilt) of the radio waves radiated from the transmission/reception antenna 57. The beams are directed more downward as the tilt angle becomes larger. Note that the antenna tilt may be controlled by controlling a physical tilt of the transmission/reception antenna 57, i.e., by a so-called "mechanical tilt" method.

When the RE 12 is in the "normal mode", the tilt angle of the transmission/reception antenna 57 (the antenna element) is set to a tilt angle for forming the cell 14 (the normal cell). On the other hand, the antenna tilt control unit 60 changes the tilt angle of the transmission/reception antenna 57 so as to form the large zone cell 15 through the switchover to the "large zone cell mode". The antenna tilt control unit 60 changes the tilt angle according to an adjustment angle contained in the control signal coming from the REC 11.

<<Hardware Configuration of RE>>

Figure 5:
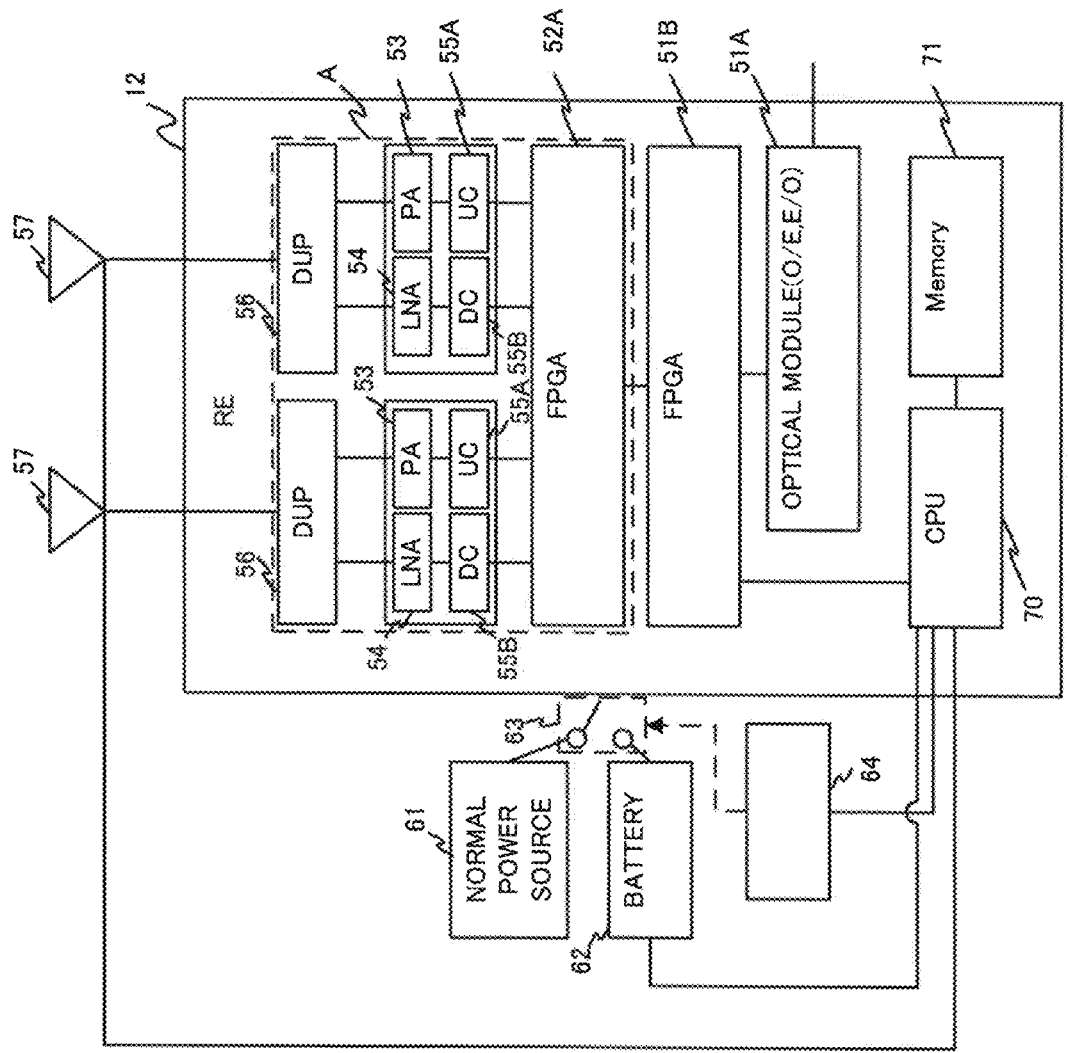
FIG. 5 is a diagram illustrating an example of a hardware configuration of the RE.

FIG. 5 is a diagram illustrating an example of a hardware configuration of the RE 12. In FIG. 5, the RE 12 includes an optical module 51A connected to the physical link (the optical fiber) leading to the REC 11, and an FPGA 51B connected to the optical module 51A.

Further, the RE 12 includes a CPU 70 connected to the FPGA 51B, a memory 71 connected to the CPU 70, and a FPGA 52A connected to the FPGA 51B. A plurality of antenna units forming the antenna array is connected to the FPGA 52A.

The antenna unit includes: an up-converter (UC) 55A and a PA 53 to process the downlink signal; an LNA 54 and a down-converter (DC) 55B to process the uplink signal; a DUP 56; and a transmission/reception antenna 57.

Moreover, the RE 12 includes the normal power source 61, the battery 62, the switch 63 and the power source switchover control unit 64. These components are the same as those described by use of FIG. 4, and hence their explanations are omitted.

The optical module 51A and the FPGA 51B function as the CPRI signal processing unit 51 illustrated in FIG. 4. The optical module 51A carries out the opto-electric conversion (O/E) on the downlink signal and the electro-optic conversion (E/O) on the uplink signal.

The FPGA 51B executes a process of convert the BB signal, the control signal and the CPRI signal. The FPGA 51B transmits and receives the BB signal to and from the FPGA 52A, and transmits and receives the control signal to and from the CPU 70.

The FPGA 52A functions as the transmission/reception unit 52 depicted in FIG. 4. Namely, the FPGA 52A functions as an orthogonal modulation/demodulation unit to execute the orthogonal modulation/demodulation process between the BB signal and the RF signal. The UC 55A generates a signal (radio wave) having the frequency of the radio wave by up-converting the uplink signal (RF signal) output from the FPGA 52A, and transmits the generated signal to the PA 53. The DC 55B generates the RF signal by down-converting the ratio wave output from the LNA 54. The RF signal output from the DC 55B is inputted to the FPGA 52A. The PA 53, the LNA 54, the DUP 56 and the transmission/reception antenna 57 are the same as those illustrated in FIG. 4.

Programs to be executed by the CPU 70 and the data to be used when executing the programs are stored in the memory 71. The memory 71 is one example of a "storage device" or a "storage medium". As one example, the memory 71 includes a RAM (Random Access Memory) and a ROM (Read Only Memory). The memory 71 can include the nonvolatile memory such as an Electrically Erasable Programmable ROM (EEPROM), a flash memory and a hard disk.

The CPU 70 loads the program stored in the memory 71 and executes the program. The CPU 70, thereby, functions as the monitor control unit 58, the power source status monitoring unit 59 and the antenna tilt control unit 60. The CPU 70 is one example of a "processor", a "controller" or a "control device".

Note that the functions (the monitor control unit 58, the power source status monitoring unit 59 and the antenna tilt control unit 60) executed by the CPU 70 illustrated in FIG. 5 can be implemented by use of the hardware such as a single or a plurality of semiconductor devices described with respect to the hardware configuration (FIG. 3) of the REC 11. Functions of the FPGA 51B and the FPGA 52A can be also implemented by employing other pieces of hardware.

Furthermore, the examples of the hardware configurations in FIGS. 3 and 5 have exemplified the optical fiber serving as the physical link between the REC 11 and the RE 12. As a matter of course, the connection between the REC 11 and the RE 12 may be established by the physical link (metal cable) for transmitting the electric signal. In this case, the optical modules 44, 51A are not required.

<Concerning Frame Timing>

Figure 6:
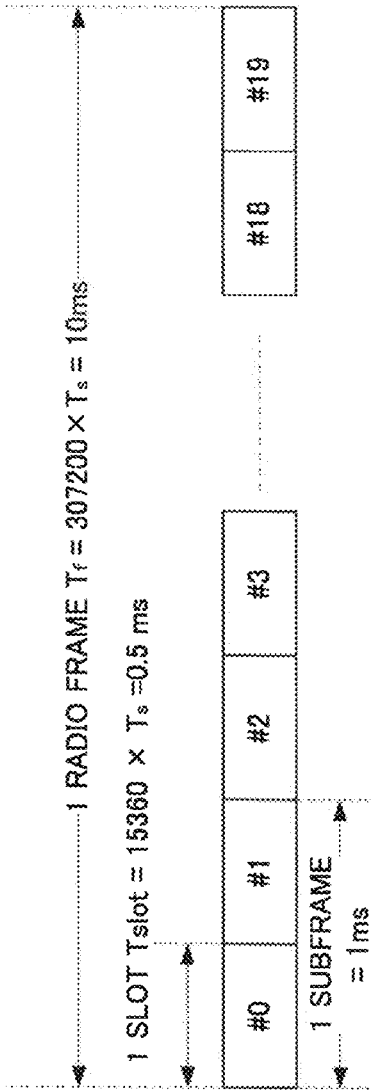
FIG. 6 is a diagram illustrating an example of a structure of a radio frame used in a base station apparatus conforming to LTE.

FIG. 6 illustrates an example of a structure of a radio frame used in the base station apparatus conforming to LTE. FIG. 6 depicts a format of the radio frame according to the LTE technical specification "TS36.211" based on 3GPP. One radio frame (10 ms) is assembled from ten sub-frames (1 ms). One sub-frame is formed by 2 slots, and one slot is formed by seven symbols. A basic time unit of the radio frame is given such as $T_s=1/(15000\times2048)$ [s].

In the base station apparatus 10, timing when transmitting the radio frame is adjusted between the cells 14 in the same base station apparatus. The transmission timing is adjusted between the cells 14, whereby the UE 13 can process multicast (Multicast Channel) transmission or broadcast (Broadcast Control Channel) transmission as single transmission on multipath propagation.

Figure 7:
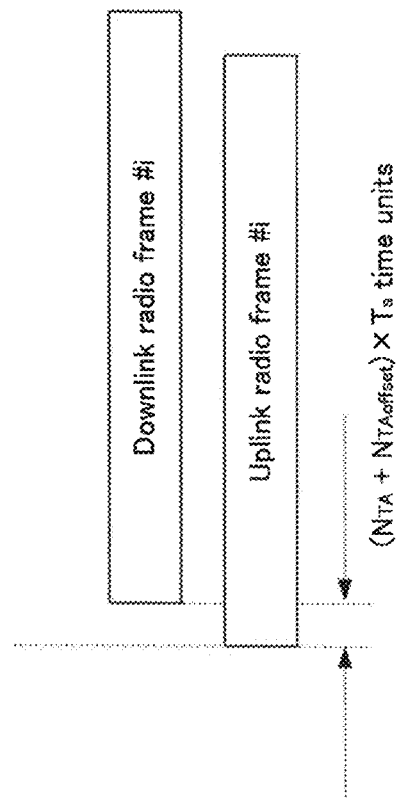
FIG. 7 is a diagram illustrating an example of start timing for a downlink radio frame and an uplink radio frame.

Further, according to TS36.211, in unicast (Dedicated Traffic Channel) transmission, the uplink radio frame is transmitted at timing earlier by $N_{TA}\times T_s$ than a timing when the downlink radio frame is detected (see FIG. 7). A symbol $N_{TA}$ represents a timing adjustment quantity for adjusting the transmission timing of the uplink radio frame. The timing adjustment quantity $N_{TA}$ functions as an indicator that indicates a deviation between an uplink radio frame reception timing in the base station apparatus 10 and a reception timing expected by the base station apparatus 10. The base station apparatus 10 transmits a command (TA command) using a value TA defined by "N/16=TA" to the UE 13, and adjusts the transmission timing of the uplink radio frame of the UE 13. The UE 13 advances the transmission timing when the TA value given by the TA command is positive but retards the transmission timing when the TA value is negative. Thus, the UE 13 keeps timing synchronization with the base station apparatus 10.

When the UE 13 migrates between the cells 14, the timing synchronization between the UE 13 and the base station apparatus 10 is adjusted by timing advance process. The UE 13 adjusts the transmission timing of the uplink radio frame according to the $N_{TA}$. On the other hand, the base station apparatus 10 adjusts transmission timing of the downlink radio frame and adjusts a delay of the uplink radio frame toward each of the cells 14, separately from a $N_{TA}$ calculation taking account of a propagation delay of the radio waves. With these adjustments, the timing is restrained from being largely different between the cells 14.

The "adjustment of the transmission timing of the downlink radio frame" described above takes it consideration to coincide the timing in the cell 14 having a maximum CPRI cable with the timing in another cell 14 when the plurality of REs 12 exists. The "adjustment of the transmission timing of the downlink radio frame" therefore entails obtaining a difference between a maximum length of the CPRI cable possessed by a certain cell 14 in the plurality of cells 14 and a length of the CPRI cable possessed by each of other remaining cells 14 (REs 12). Then, the transmission timing of the downlink radio frame toward each of other remaining cells 14 is given a delay corresponding to the relevant difference.

Moreover, the "adjustment of the delay of the uplink radio frame" described above involves executing a frame process taking account of the delay corresponding to the difference from the maximum length of the CPRI cable. A delay of time expended for the "adjustment of the transmission timing of the downlink radio frame" and the "adjustment of the delay of the uplink radio frame" is defined as a "maximum base station allowable delay" related to the radio frame timing. The "maximum base station allowable delay" is unique to the base station apparatus 10.

The "maximum base station allowable delay" indicates a capability to perform a process of absorbing the delay time occurring between the REC 11 and the UE 13 in order to keep the communications. The "maximum base station allowable delay" is delay time [chip] allowed as a period of time till the downlink signal reaches the UE 13 via the RE 12 from the BB signal processing unit 27, and contains radio wave propagating time [chip]. Further, the CPRI cable length indicates a length of the CPRI cable that interconnects the REC 11 and the RE 12. The CPRI cable length is expressed by the delay time [chip] in the case of, e.g., the optical transmission. The CPRI cable length is one example of a "cable length", and the cable length is one example of a "length of a transmission path between REC and RE".

<Concerning Cell Radius and Cable Length>

The "maximum base station allowable delay" is related to a "maximum cell radius" of the cell 14 formed by each RE 12 of the base station apparatus 10. A maximum cable length in the plurality of cables interconnecting the REC 11 and each of the REs 12 included in the base station apparatus 10, is defined such as a "maximum cable length "a" [chip]". The maximum cable length "a" is expressed by the following formula (1):

$$a=\max[\text{cell (RE)\#1 cable length, cell (RE)\#2 cable length}, \ldots \text{cell (RE)\#n cable length}] \quad (1)$$

When letting "b" [chip] be the "maximum base station allowable delay" and "c" [chip] be the maximum cell radius, a relationship with the maximum cable length "a" is expressed by the following formula (2):

$$c=b-a \quad (2)$$

Herein, the "cell radius" is defined as a path, on the propagation of the radio waves, extending from an edge of the antenna of the RE 12 to the UE 13, and the cell radius defined by the formula (2) represents the "maximum cell radius". A radio wave propagation path equal to or larger than the "maximum cell radius" cannot be set with respect to all the REs 12, using the same frequency band, provided in the base station apparatus 10.

Figure 8:
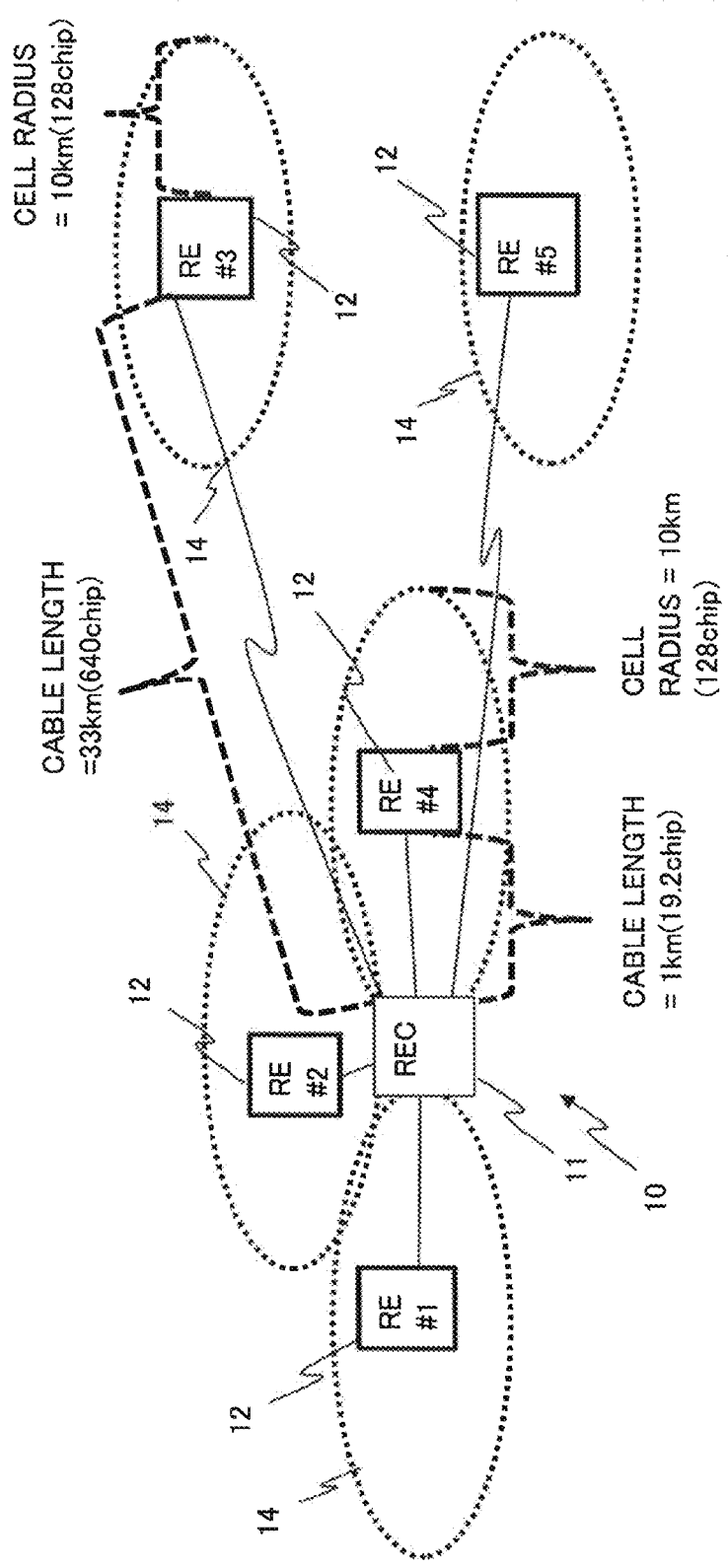
FIG. 8 illustrates an example of installing a "normal cell" taking account of a "maximum base station allowable delay"

FIG. 8 illustrates an example of installing the normal cell (cell 14) taking account of the maximum base station allowable delay. As illustrated in FIG. 8, for instance, when the maximum base station allowable delay b=768[chip] and when the maximum cable length a=640[chip], a maximum cell radius c becomes 128 [chip] through a [chip] conversion. The cell radius of each cell 14 becomes, e.g., 10 km.

A relationship between a radio wave propagation distance and a chip rate is given by the following formula (3). Further, a relationship between a cable propagation distance and the chip rate is given by the following formula (4). Note that the chip rate indicates a velocity of a diffusion code and is given such as $3.84 \times 10^6$ [chip/s] in the 3G, the LTE and the LTE-A.

$$\text{Chip rate [chip]} = 12.8[\text{chip/km}] \times \text{radio wave propagation distance [km]} \quad (3)$$

$$\text{Chip rate [chip]} = 19.8[\text{chip/km}] \times \text{cable length[km]} \quad (4)$$

Accordingly, the radio wave propagation distance in the example illustrated in FIG. 8 is equal to 10 [km] when following the formula (3). Further, when converting the maximum cable length=640 [chip] in the example illustrated in FIG. 8 into a distance, the distance is equal to 33 [km] according to the formula (4).

Generally, the cell having the cell radius up to about 10[km] is called a "small zone cell" or an "intermediate zone cell". The small zone cell and the intermediate zone cell are, when generically indicated, referred to as the "normal cell". By contrast, the cell having the cell radius larger than that of the normal cell is called the "large zone cell". One example is that the normal cell covers the cells each having the cell radius up to 10 km, while the large zone cell covers the cells each having the cell radius exceeding 10 km.

Accordingly, the "large zone cell mode" described above implies that this mode is operated with such setting that a certain RE 12 forms the large zone cell 15 covering a range being broader than the cell 14. Moreover, the "normal cell (normal cell mode)" implies that this mode is operated with such setting that a certain RE forms the cell having the cell radius being smaller than that of the large zone cell.

When there exists the plurality of cells 14 using the same frequency band, the timing is adjusted so that the transmission timing of the radio frame is coincident with the transmission timing of the cell 14 having the maximum cable length in the plurality of cells 14. Therefore, the cell radius formed by the RE 12 having the cable length being shorter than the "maximum cable length", does not exceed the "maximum cell radius".

Figure 9:
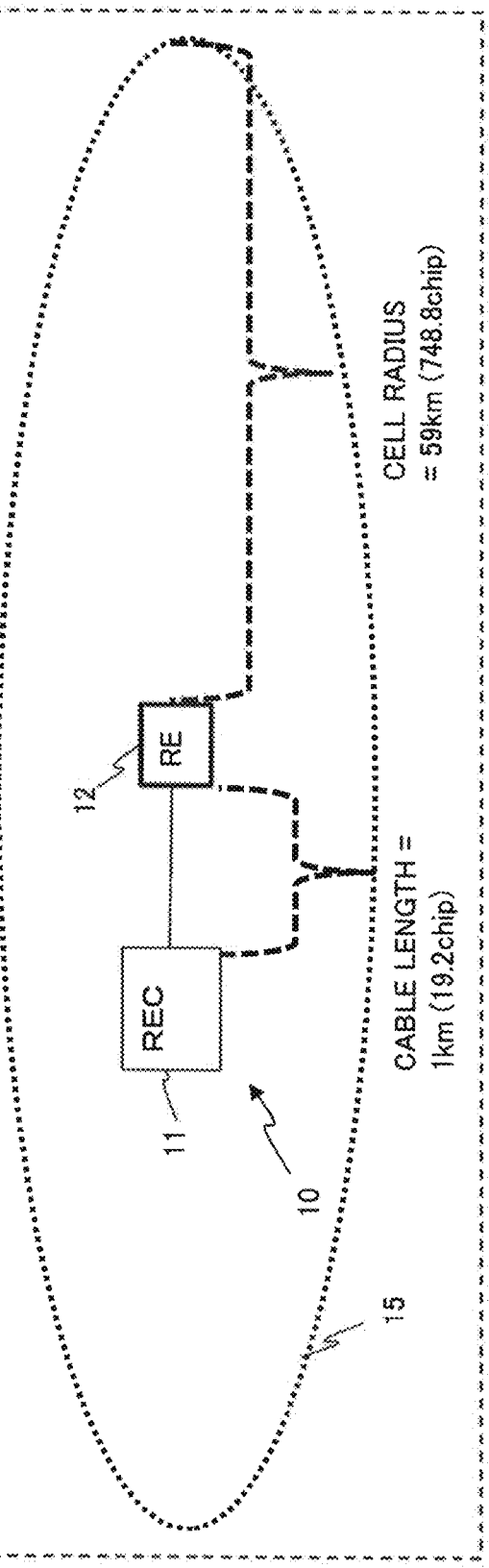
FIG. 9 illustrates an example of a layout of a large zone cell.

FIG. 9 illustrates an example of a layout of the large zone cell. In recent years, it has been expected to maintain the communication area (also said to be a coverage area) of the wireless communication system irrespective of an emergency typified by a disaster such as an earthquake, a fire and occurrences of other events. In preparation against when the disaster happens, for example, it is considered that the large zone cell 15 as in FIG. 9 is formed. In this case, the radio wave propagation distance of the large zone cell 15 is set in adjustment to a value being larger than 10 km. FIG. 9 illustrates an example in which the radio wave propagation distance is previously set to 58.5 [km] (approximately equal to 59 km), and a parameter in the base station apparatus is adjusted corresponding to this propagation distance. When the "maximum base station allowable delay" is 768[chip] and when the cell radius is set to 748.8 [chip] (58.5[km]), the cable length becomes 19.2[chip] (equal to 1[km]).

The data storage memory 25 of the base station apparatus 10 is previously stored with set values of the "maximum cable length", the "maximum base station allowable delay" and the "maximum cell radius". When starting the operation of the base station apparatus 10, the stored set values are read, and the operation based on the set value is executed during an operating status.

<Example of Operation of Base Station Apparatus>

Figure 10:
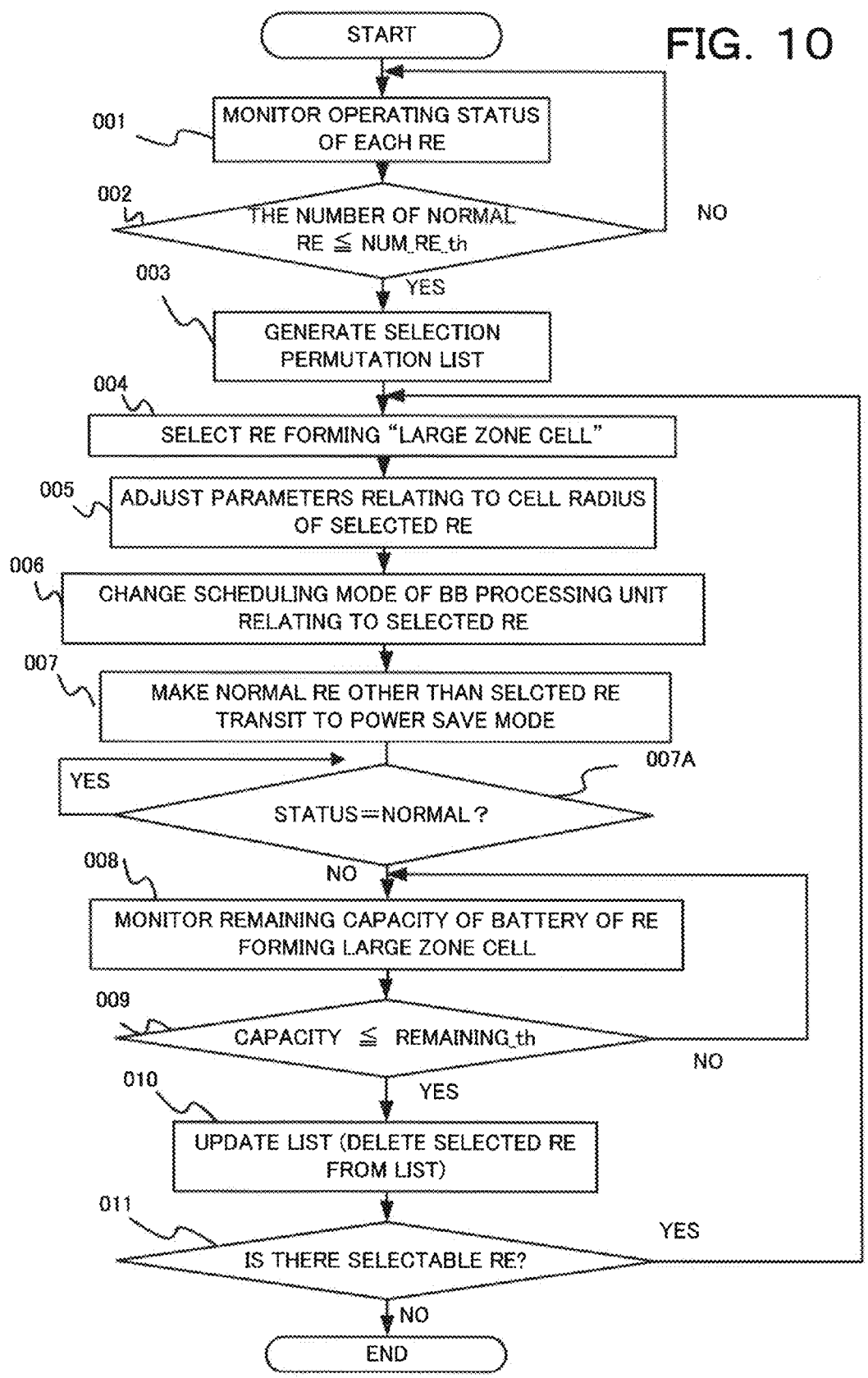
FIG. 10 is a flowchart illustrating a whole operational example including a switchover process to the large zone cell mode in the base station apparatus.

FIG. 10 is a flowchart illustrating an example of an overall operation including the switchover process to the large zone cell mode in the base station apparatus 10. Processes illustrated in FIG. 10 start from a normal operating status of the base station apparatus 10. The "normal operating status" connotes a status to use the normal cell 14 formed by each of the plurality of REs 12.

To begin with, the CPU 40 functioning as the CPRI connection status monitoring unit 29 executes monitoring the operating status of each RE 12 (001). The operating status is monitored in a way that the CPU 40 uses, e.g., a health check signal. A monitored result (status information indicating a "normal/abnormal" status of each RE 12) of the CPRI connection status monitoring unit 29 is stored in the DIMM. 41 or the memory 25 in a format usable by the mode switchover processing unit 31.

As described above, however, the monitoring unit 28 monitors a device failure of each RE 12, and the failure of the RE 12, which is detected other than the health check result of the CPRI, may be reflected in the status information. Namely, when at least one of a communication failure, a link failure, a device failure and a software error with respect to each RE 12 is detected, this RE 12 may be determined to be in the abnormal status.

Next, the mode switchover processing unit 31 (the CPU 40 functioning as the mode switchover processing unit 31) refers to the status information (the normal/abnormal status of each RE 12) obtained by the CPRI connection status monitoring unit 29 (alternatively by the CPRI connection status monitoring unit 29 and the monitoring unit 28). The mode switchover processing unit 31 counts the number of the REs 12 in the normal status by use of the status information, and compares the number of the REs 12 with a predetermined threshold value "NUM_RE_th" (002). The threshold value "NUM_RE_th" is the threshold value used for determining whether a switchover to an emergency mode (the large zone cell mode) is carried out or not by monitoring a RE count (the number of the REs) in the normal status. The threshold value "NUM_RE_th" is one example of a "predetermined value".

When the number of the REs 12 in the normal status is not equal to or smaller than "NUM_RE_th" (002, NO), a normal operating status continues. Whereas when the number of the REs 12 in the normal status is equal to or smaller than "NUM_RE_th" (002, YES), the mode switchover processing unit 31 determines that the switchover to the large zone cell mode is needed. Note that as to the determinations in 002 of FIG. 10 and in 009 which will be described later on, it may be sufficient to determine whether the number of the normal REs reaches the predetermined range or not. Therefore, a determination about whether less than the threshold value or not, may be made.

At this time, the mode switchover processing unit 31 generates a "selection permutation list" related to the REs 12 in the normal status (003), and selects the RE 12 being ranked at the top of the selection permutation list as the RE 12 operating with the large zone cell mode (004). A process of generating the selection permutation list will be described later on. In the following discussion, the RE 12 operating with the large zone cell mode may be sometimes expressed as a "selected RE". The selection permutation list is one example of a "list".

Subsequently, the mode switchover processing unit 31 adjusts the parameter pertaining to the cell radius of the large zone cell 15 formed by the selected RE (005). An in-depth description of the adjustment of the parameter will be given later on. The selected RE is switched over to the large zone cell mode according to a result of the parameter adjustment. Namely, the mode switchover processing unit 31 gives, to the antenna control unit 30, an antenna control instruction containing an antenna adjustment parameter used for the selected RE obtained based on the parameter adjustment to form the large zone cell 15.

The antenna control unit 30 generates the control signal containing an antenna adjustment parameter in accordance with the antenna control instruction, and gives the generated control signal to the CPRI signal processing unit 26 (FPGA 43) associated with the selected RE. The control signal is converted into the CPRI signal by the CPRI signal processing unit 26 and transmitted to the selected RE. Note that the mode switchover processing unit 31 may directly (without via the antenna control unit 30) generate the control signal containing the antenna adjustment parameter and may execute the transmission process.

In the selected RE, the CPRI signal processing unit 51 (FPGA 51B) converts the CPRI signal into the control signal, and the control signal is given to the antenna tilt control unit 60 (CPU 70). The antenna tilt control unit 60 changes an antenna tilt (tilt angle) of the transmission/reception antenna 57 in accordance with the control signal. With this change, a radio wave radiation range from the selected RE expands, thus forming the large zone cell 15 having a desired cell radius.

Next, the mode switchover processing unit 31 instructs the BB signal processing unit 27 (the DSP 42 functioning as the BB signal processing unit 27) to change a scheduling mode related to the selected RE to a "large zone cell scheduling mode" together with the cell information of the selected RE (006).

The BB signal processing unit 27 receiving the instruction adjusts, as a change process to the "large zone cell scheduling mode", e.g., the number of resource blocks (RB) that can be allocated to each of the UEs 13 connected to the large zone cell 15, and an allocation interval of the data of each of the UEs 13. With this adjustment, the number of the UEs 13 connectable in parallel is increased by using the large zone cell 15 formed by the selected RE. An in-depth description of the change to the large zone cell scheduling mode will be given afterward.

The mode switchover processing unit 31 tries to transit all the REs 12 ("non-selected REs") other than the selected RE to a power save mode (007). The non-selected REs are thereby separated temporarily from the cell operation. The separation from the cell operation is carried out for avoiding the interference with the large zone cell by stopping the non-selected REs 12 in the abnormal status from forming the cells. Alternatively, the separation from the cell operation is conducted for avoiding an intricate and time consuming process such as adjusting the transmission timing of the radio frame between the large zone cell 15 of the selected RE and the non-selected RE in the normal status. Therefore, the mode switchover processing unit 31 issues an operation instruction (a power save mode instruction) in the power save mode to the non-selected RE. However, the non-selected RE in the normal status is allowed to continuously form the cell as the case may be.

The power save mode instruction is converted by the CPRI signal processing unit 26 (FPGA 43) into the CPRI signal, and the CPRI signal is transmitted to each non-selected RE. In each non-selected RE, the CPRI signal processing unit 51 (FPGA 51B functioning as the CPRI signal processing unit 51) obtains the power save mode instruction through the conversion from the CPRI signal. The CPRI signal processing unit 51 gives the power save mode instruction to the monitor control unit 58 (CPU 70 functioning as the monitor control unit 58).

The monitor control unit 58 carries out control for the RE 12 to operation in the power save mode in accordance with the power save mode instruction. For example, the monitor control unit 58 (CPU 70) sets OFF an unillustrated switch provided between the switch 63 and the power save control range A (RF unit). With this setting, the power supply to the power save control range A is stopped. As a result, the relevant non-selected RE 12 stops radiating the radio waves and comes to a status of not forming the cell 14.

Even under the power save mode, however, the FPGA 51B, the CPU 70, the memory 71, etc. continue to be supplied with the power. At least, the non-selected RE indicating the normal status is thereby enabled to, e.g., transmit and receive the control signal to and from the REC 11 and to execute the control based on the control signal. It is to be noted that it depends on a cause of the abnormality (a portion and a degree of the failure) whether the non-selected RE in the abnormal status transitions to the power save mode or not.

Next, the mode switchover processing unit 31 checks the status of the power source of the selected RE, and determines whether the status of the power source is of the "normal power source" or the "battery" (007). The status of the power source can be checked by referring to the selection permutation list (though a detailed description thereof will be given afterward, the power source can be determined to be the "normal power source" when the selected RE belongs to a high-order group but to be the "battery" when belonging to a low-order group). Alternatively, the status of the power source may also be checked by referring to a battery status managed by the RE battery status monitoring unit 32.

When the status of the power source is of the "normal power source" (007A, YES), the operation with the large zone cell mode of the selected RE is maintained. Whereas when the status of the power source is not of the "normal power source" (but of the "battery") (007A, NO), the mode switchover processing unit 31 monitors the battery remaining capacity of the selected RE (008).

The battery remaining capacity will be monitored as follows. The power source status monitoring unit 59 (CPU 70 functioning as the power source status monitoring unit 59) of the selected RE monitors the remaining capacity of the battery 62. The power source status monitoring unit 59 generates the control signal containing the battery status at the proper timing. The control signal is transmitted via the CPRI to the REC 11.

In the REC 11, the RE battery status monitoring unit 32 (CPU 40 functioning as the RE battery status monitoring unit 32) receives, from the CPRI signal processing unit 26, the control signal given from the selected RE, and manages the battery status contained in the control signal. For example, the CPU 40 functioning as the RE battery status monitoring unit 32 stores the battery status of each RE 12 in a storage area of the DIMM 41 or the memory 25. The CPU 40 functioning as the mode switchover processing unit 31 reads and refers to the stored battery status of each RE 12. Details of how the battery status is monitored will be described later on.

The mode switchover processing unit 31 determines whether or not the battery remaining capacity of the selected RE is equal to or smaller than a predetermined threshold value "REMAINING th" (009). When the battery remaining capacity is not equal to or smaller than the threshold value (009, NO), the processing returns to 008 and the battery remaining capacity is continuously monitored. Whereas when the battery remaining capacity is equal to or smaller than the threshold value (009, YES), the mode switchover processing unit 31 executes an update process of deleting the selected RE from the selection permutation list (010). Note that the process in 009 may be executed based on determining whether less than the threshold value or not.

The mode switchover processing unit 31 determines whether or not the selection permutation list contains the non-selected RE selectable as the selected RE (011). At this time, when the selectable non-selected RE is contained therein (011, YES), the processing loops back to 004. Thus, the new selected RE is selected from within the non-selected REs, and there are performed the switchover to the "large zone cell mode" related to the new selected RE and then the operation of the "large zone cell". Whereas when the selectable non-selected RE is not contained therein (011, NO), the operation of the "large zone cell" is stopped.

Note that the process in 007 may be executed before 005 or 006. Alternatively, the process in 007 may also be executed in parallel with at least one of the process in 005 and the process in 006.

Further, the processes illustrated in FIG. 10 represent the processes related to the plurality of REs using one frequency band. When the base station apparatus 10 handles the plurality of frequency bands (when the plurality of REs 12 uses the plurality of frequency bands), the processes illustrated in FIG. 10 are executed, e.g., per frequency band. However, in each of the processes illustrated in FIG. 10, the processes related to the plurality of frequency bands may also be executed in parallel, if necessary.

In the operational example described above, when the battery remaining capacity of the selected RE reaches the predetermined range, it is determined that the selected RE cannot operate the large zone cell mode, and next the RE 12 performing the switchover to the large zone cell mode is selected from the selection permutation list. However, when the RE 12 (selected RE) forming the large zone cell 15 gets into the failure and also when detecting that the RE 12 comes to the abnormal status, the selection permutation list may be updated, and subsequently the selectable RE 12 is allowed to switch over the mode to the large zone cell mode.

For example, a process of determining whether the selected RE is in the normal status or not is added to between 007 and 007A, and, when not in the normal status, the processes in FIG. 10 can be modified so that the processing advances to 010. Alternatively, when the selected RE does not report the normal battery status during monitoring the battery remaining capacity in 008, the processing may be contrived to advance to 010. This modification being thus done, the RE 12 forming the large zone cell 15 can be changed upon being triggered by the abnormality (failure) of the selected RE.

<Generation of Selection Permutation List>

Next, a selection permutation list generating process (003 in FIG. 10) will be described. The selection permutation list generating process is executed by the CPU 40 functioning as the mode switchover processing unit 31. The selection permutation list generating process is carried out in the following procedure.

(1) At first, the REs 12 having the normal status are grouped into a plurality of frequency groups (frequency group classification).

(2) Next, within each of the frequency groups, the REs 12 are classified into a high-order group and a low-order group (high-order group/low-order group classification).

(3) Finally, the REs 12 are ranked (sorted) with respect to each of the high-order group and the low-order group in each of the frequency groups.

Note that the selection permutation list may be previously created at proper timing without being triggered by the process in 002, and the REs 12 in the abnormal status may be deleted from the selection permutation list.

<<(1) Frequency Group Classification>>

Figure 11:
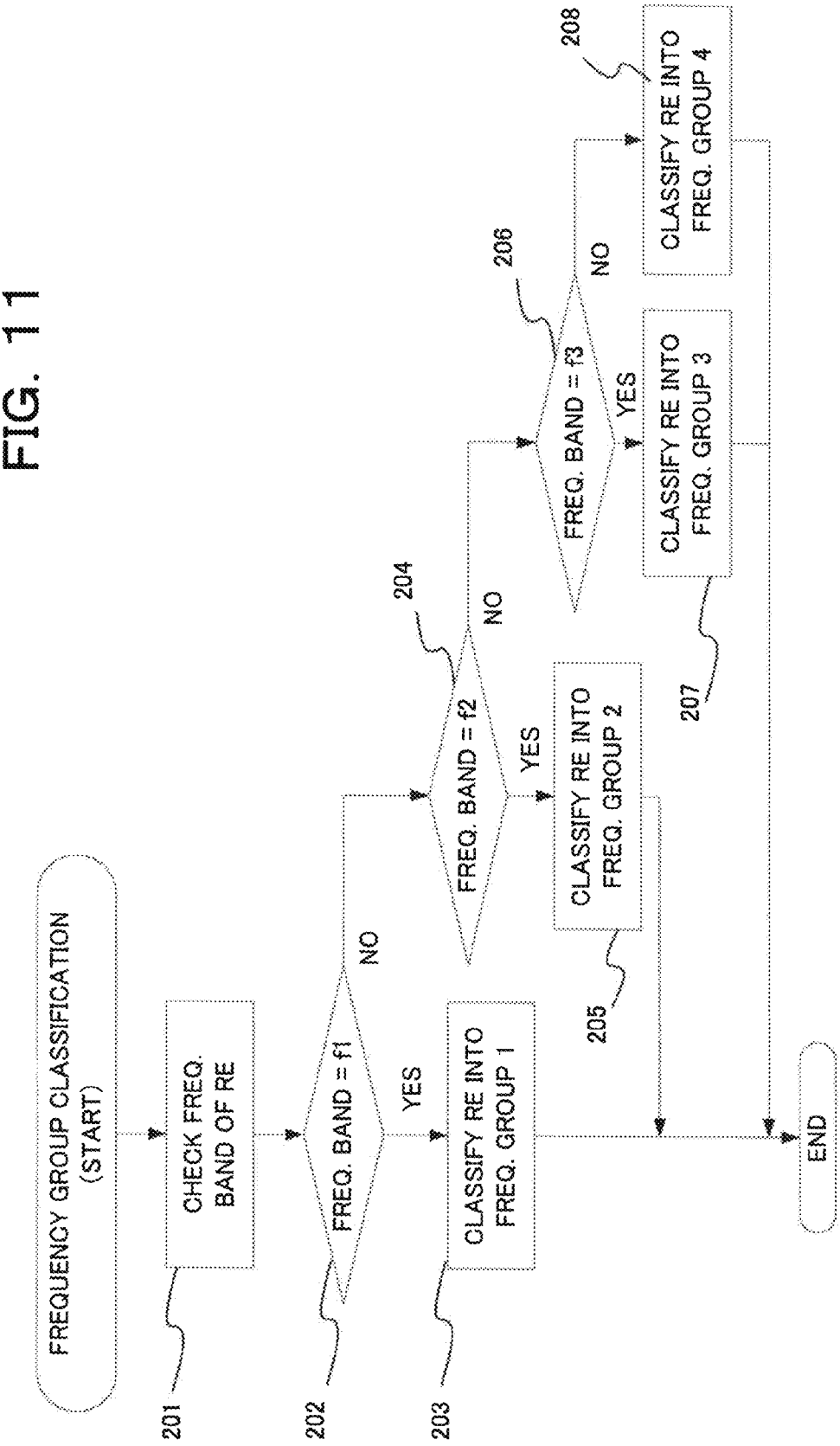
FIG. 11 is a flowchart illustrating a processing example of "frequency group classification"

FIG. 11 is a flowchart illustrating a processing example of the "frequency group classification". Targets of processes illustrated in FIG. 11 are all the REs 12 having the normal status, and the processes illustrated in FIG. 11 are executed for every RE 12. In the example depicted in FIG. 11, the base station apparatus 10 can use an n-number of frequencies f1, f2, . . . , fn. The corresponding frequency groups 1, 2, . . . , n are set per frequency band. A case of "4" being given as an n's value will be described by way of an example.

In 201, the mode switchover processing unit 31 checks the frequency band of one RE 12 selected from within the REs 12 taking the normal status. In 202, the mode switchover processing unit 31 determines whether the checked frequency band is the "frequency band f1" or not. At this time, when the frequency band is the frequency band f1 (202, YES), the mode switchover processing unit 31 classifies the REs 12 into the frequency group 1 (group of the frequency band f1) (203), and terminates the processing.

When the frequency band is not the frequency band f1 (202, NO) in 202, the mode switchover processing unit 31 determines whether the frequency band is the frequency band f2 or not (204). At this time, when the frequency band is the frequency band f2 (202, YES), the mode switchover processing unit 31 classifies the REs 12 into the frequency group 2 (group of the frequency band f2) (205), and finishes the processing.

When the frequency band is not the frequency band f2 (204, NO) in 204, the mode switchover processing unit 31 determines whether the frequency band is the frequency band f3 or not (206). At this time, when the frequency band is the frequency band f3 (206, YES), the mode switchover processing unit 31 classifies the REs 12 into the frequency group 3 (group of the frequency band f3) (207), and terminates the processing.

When the frequency band is not the frequency band f3 in 206 (206, NO), the mode switchover processing unit 31 classifies the REs 12 into the frequency group 4 (group of the frequency band f4) (208), and finishes the processing.

Figure 12:
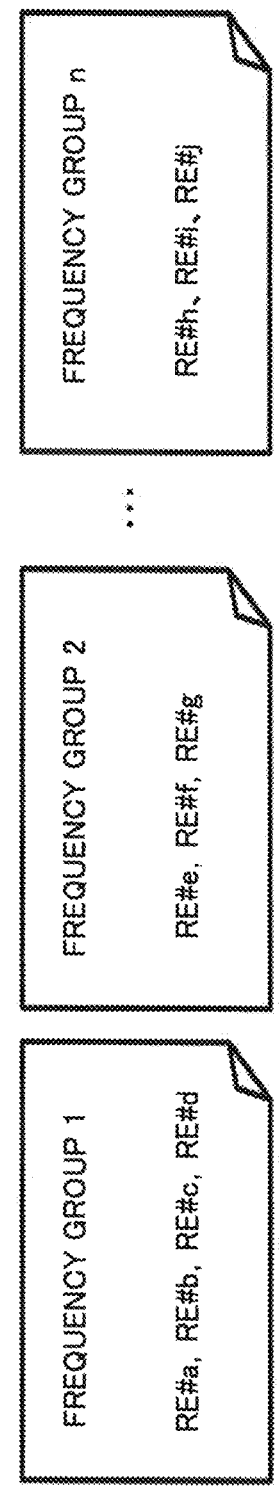
FIG. 12 is an explanatory diagram illustrating an example of a processing result of the frequency group classification.

FIG. 12 is an explanatory diagram illustrating an example of a processing result of the frequency group classification. FIG. 12 depicts, when there exists a plurality of RE#a-RE#j (different from the configuration in FIG. 1) connected to the REC 11, how these RE#a-RE#j are classified into any of frequency groups 1-n. Note that one single RE 12 supports the plurality of frequency bands as the case may be. Then, one single RE 12 operates to form the large zone cells 15 of the plurality of frequency bands in parallel as the case may be.

<<(2) High-Order Group/Low-Order Group Classification>>

Figure 13:
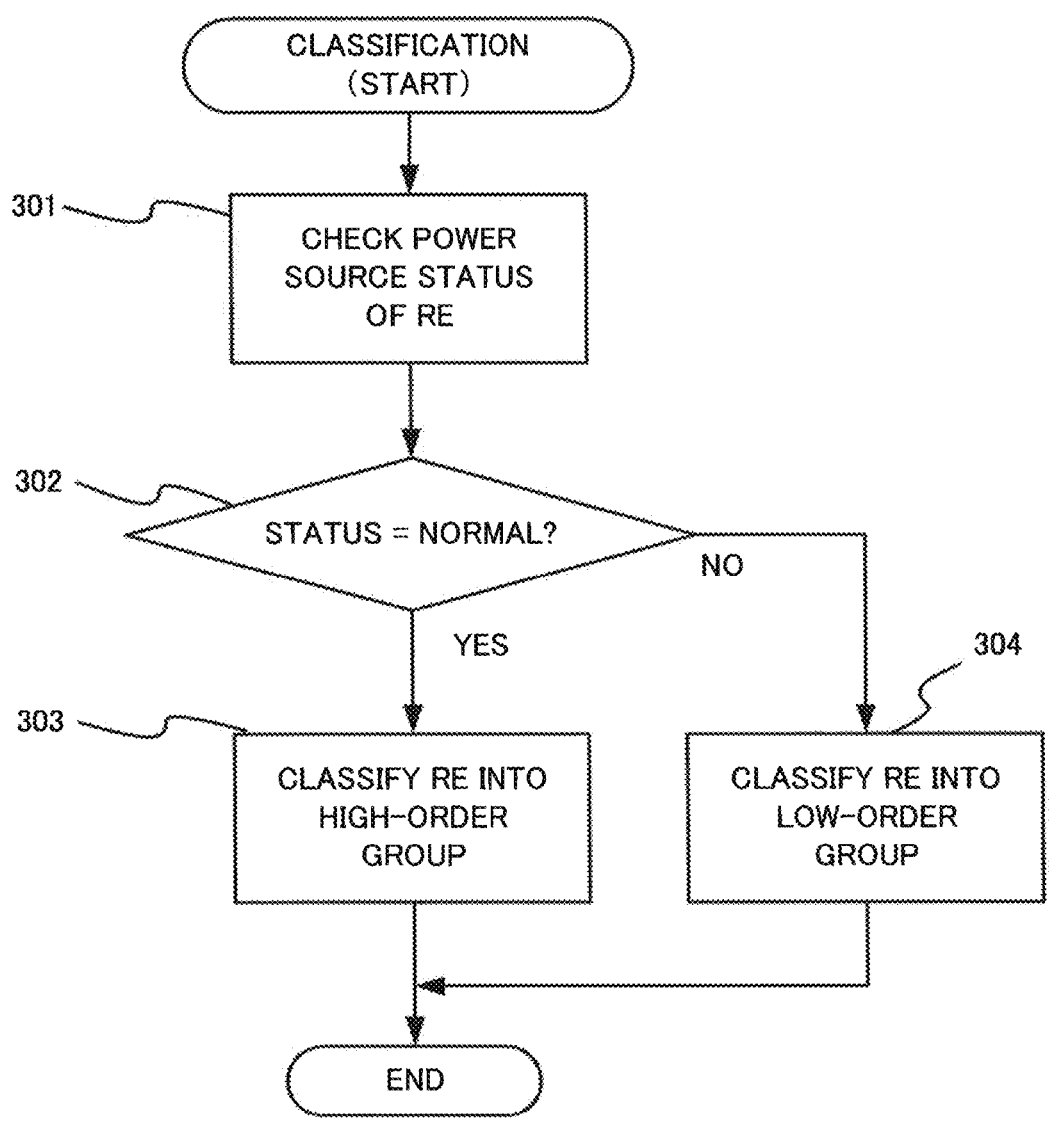
FIG. 13 is a flowchart illustrating a processing example of "high-order group/low-order group classification"

FIG. 13 is a flowchart illustrating a processing example of the "high-order group/low-order group classification". Processes illustrated in FIG. 13 are executed after completing the process of the frequency group classification. The processes illustrated in FIG. 13 are also executed per frequency group and per RE 12.

In 301, the mode switchover processing unit 31 checks the status of the power source of the RE 12. The status of the power source is checked based on the status of the power source of each RE 12 managed by the RE battery status monitoring unit 32. The mode switchover processing unit 31 determines in 302 whether the status of the power source is of the "normal power source" or not. When the status of the power source is of the "normal power source" (302, YES), the mode switchover processing unit 31 classifies the RE 12 into the high-order group (303). Whereas when the status of the power source is not of the "normal power source" (but of the "battery") (302, NO), the mode switchover processing unit 31 classifies the RE 12 into the low-order group (304).

Figure 14:
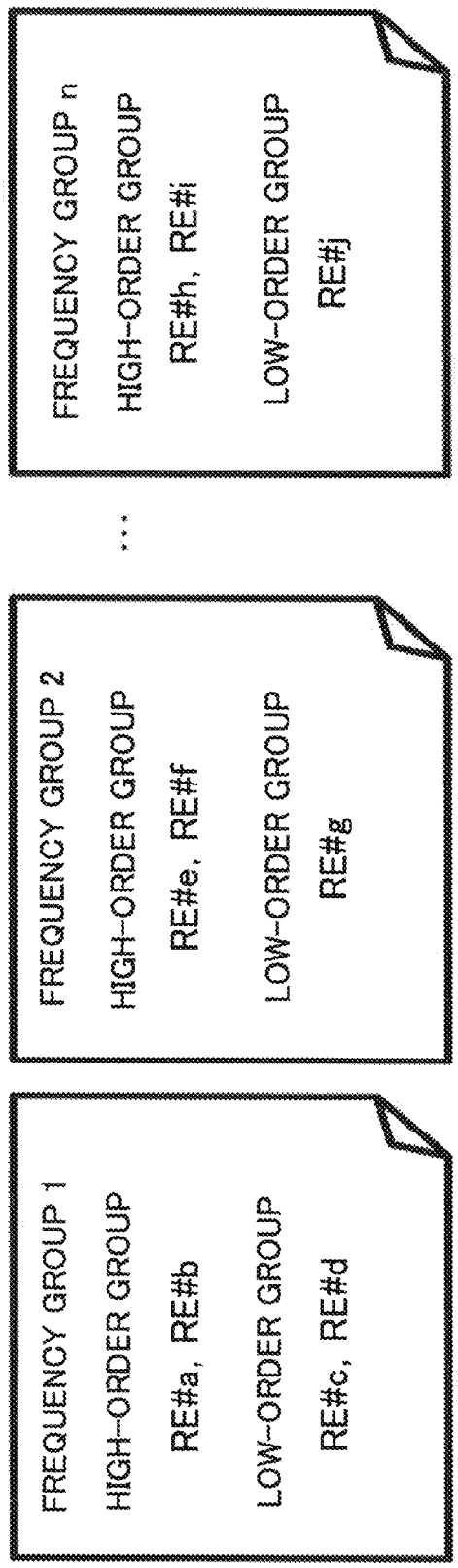
FIG. 14 is an explanatory diagram illustrating an example of a result of a high-order group/low-order group classifying process.

FIG. 14 is an explanatory diagram illustrating an example of a result of the high-order group/low-order group classifying process. For example, in the frequency group 1 (frequency band f1, RE#a and RE#b are classified into the high-order group, while RE#c and RE#d are classified into the low-order group. In other frequency groups, the same classification is conducted.

<<(3) Sorting>>

Figure 15:
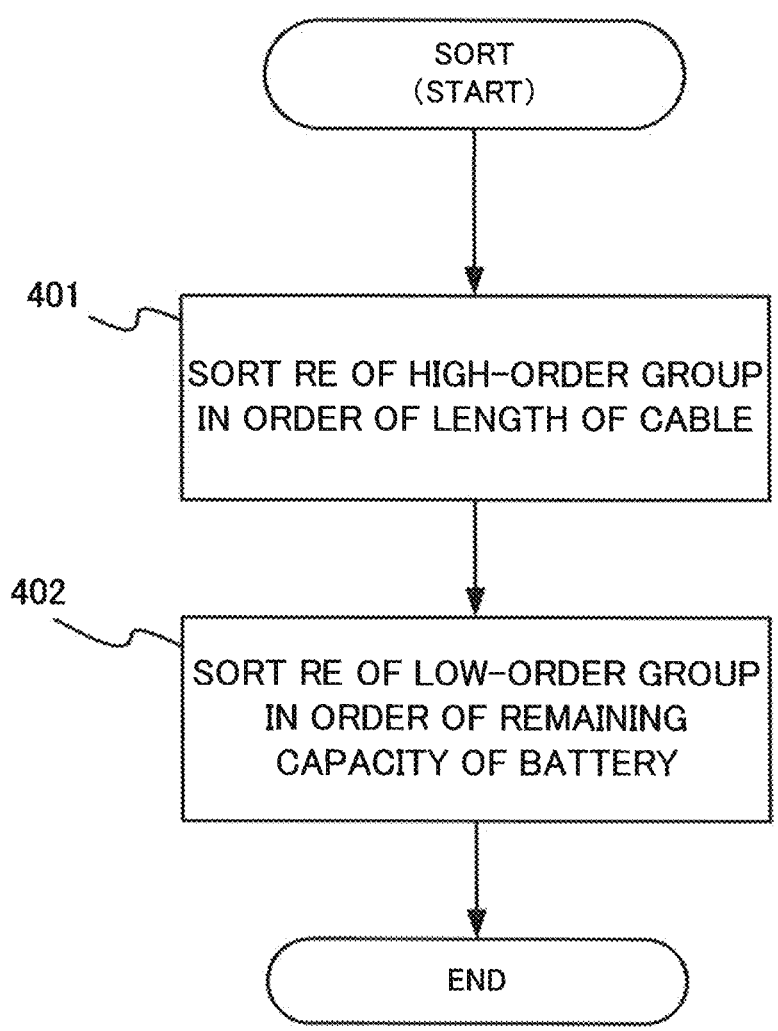
FIG. 15 is a flowchart illustrating a processing example of "sorting"

FIG. 15 is a flowchart illustrating a processing example of "sorting". Processes illustrated in FIG. 15 are executed with respect to the high-order group and the low-order group being the frequency groups generated by the high-order group/low-order group classifying process.

In 401, the mode switchover processing unit 31 arranges (sorts) the REs 12 belonging to the high-order group in ascending order of the cable length. The REs 12 are sorted in a sequence from the shortest in cable length. Namely, in the sequence of the REs 12 generated by the sorting, the RE 12 having the shortest cable length is disposed on a head of the sequence and the RE 12 having the longest cable length is disposed on an end of the sequence. The cable lengths of each of the REs 12 are stored beforehand in the memory 25 (CF 39), and the mode switchover processing unit 31 sorts the REs 12 by making use of the stored cable lengths.

In 402, the mode switchover processing unit 31 arranges (sorts) the REs 12 belonging to the low-order group in ascending order of the battery remaining capacity. The REs 12 are sorted in a sequence from the greatest in the remaining capacity. Namely, in the sequence of the Res 12 generated by the sorting, the RE 12 having the greatest remaining capacity is disposed on a head of the sequence and the RE 12 having the fewest remaining capacity is disposed on an end of the sequence. As for the battery remaining capacity, the battery residual quantities of each of the REs 12 are referred to, these battery residual quantities being managed by the RE battery status monitoring unit 32. Such a point is taken into consideration that a period of operable time of the selected RE becomes longer as the battery remaining capacity becomes larger.

Figure 16:
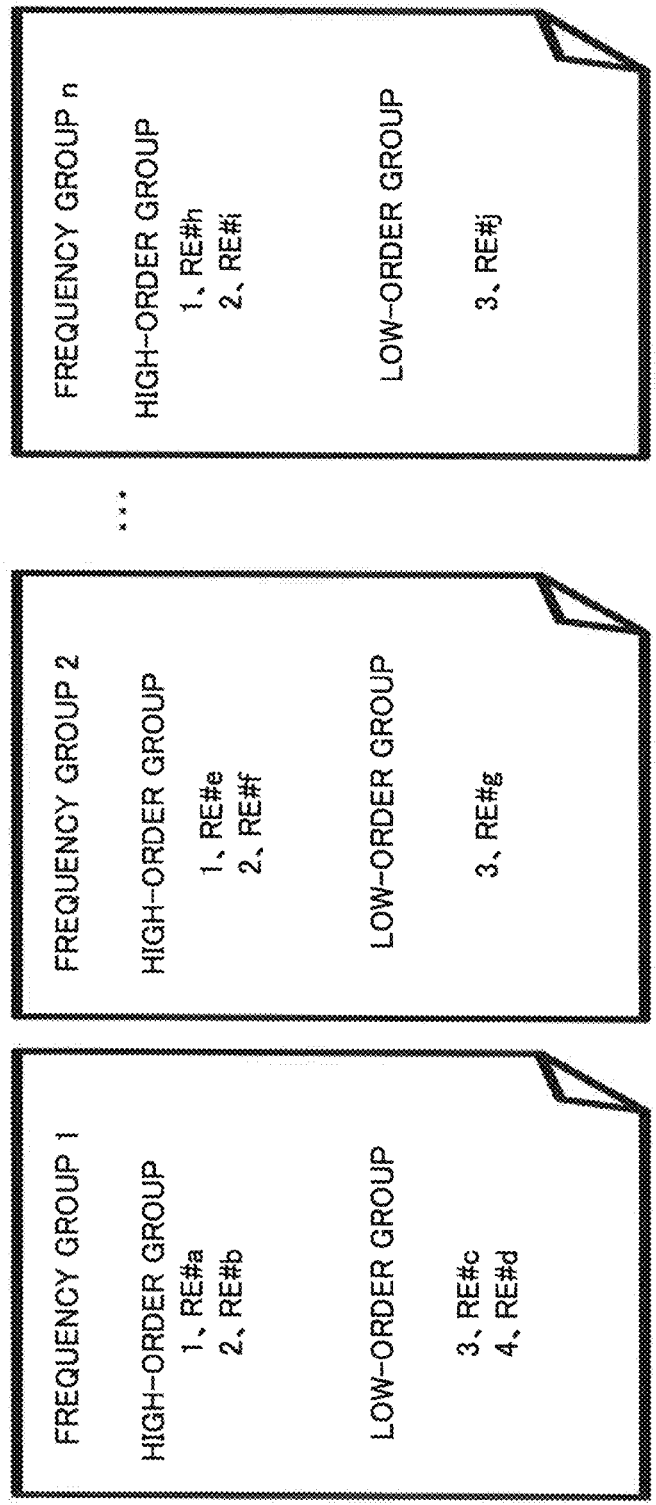
FIG. 16 is an explanatory diagram illustrating an example of a result of a sorting process.

FIG. 16 is an explanatory diagram illustrating an example of a result of the sorting process. Illustrated, e.g., is a situation of how the REs are ranked in the sequence of RE#a, RE#b with respect to the high-order group of the frequency group (frequency band f1). Illustrated also is an example of sorting the REs in the sequence of RE#c, RE#d with respect to the low-order group of the frequency group 1. A rank order of the low-order group is subordinate to a rank order of the high-order group. For example, RE#c and RE#d in the frequency group 1 are ranked third and fourth subsequent to the first rank and the second rank in the high-order group.

The list as illustrated in FIG. 16 is the final selection permutation list. In the process of 004 in FIG. 10, the RE 12 of the highest-order (first rank) in the selection permutation list is selected as the selected RE. The selection permutation list is managed in a way that, e.g., the CPU 40 functioning as the mode switchover processing unit 31 stores the list in the DIMM 41 or the memory 25.

<Parameter Adjustment Concerning Cell Radius of Large Zone Cell>

Figure 17:
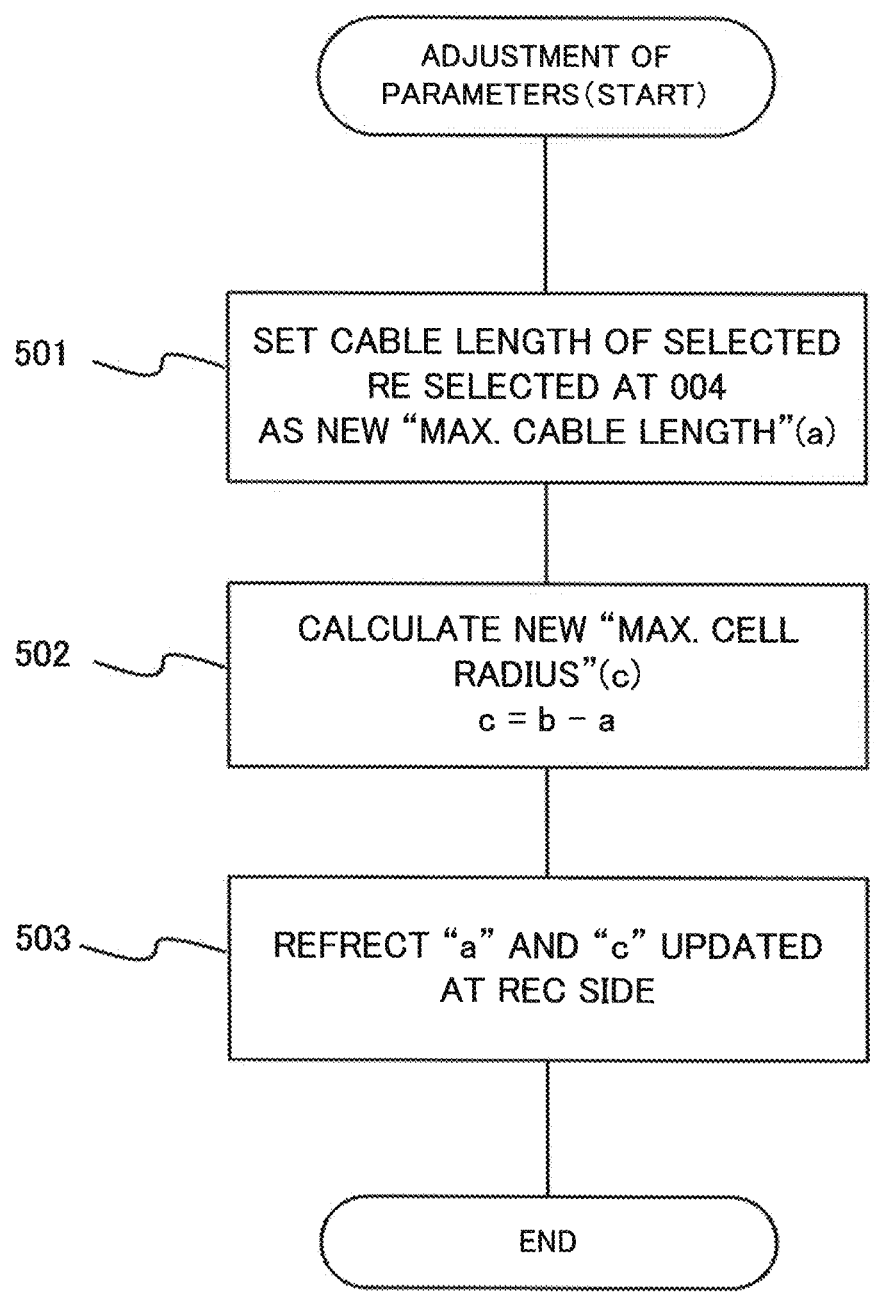
FIG. 17 is a flowchart illustrating an example of a parameter adjusting process related to a cell radius.

FIG. 17 is a flowchart illustrating an example of a parameter adjusting process concerning the cell radius, the process being executed in 005 of FIG. 10. Processes in FIG. 17 are started after determining the selected RE in 004 (FIG. 10).

The mode switchover processing unit 31 sets the cable length of the selected RE to a new maximum cable length "a" (501). The memory 25 (CF 30) is previously stored with the cable lengths of each of the REs 12, and the mode switchover processing unit 31 uses the cable length of the selected RE, the length being is stored in the memory 25.

Next, the mode switchover processing unit 31 calculates a maximum cell radius c by using the formula (2) described above in a way that employs a present maximum base station allowable delay b and the maximum cable length a (502). Subsequently, the mode switchover processing unit 31 reflects the maximum cable length a and the maximum cell radius c, which are updated with respect to the selected RE (503). To be specific, the mode switchover processing unit 31 adjusts the antenna tilt of the selected RE by controlling the antenna control unit 30 in order for the selected RE to form the large zone cell 15 having the maximum cell radius c.

<Adjustment of Antenna Tilt>

The mode switchover processing unit 31 calculates an antenna tilt (tilt angle) "$\theta\_post$ [°]" for forming the large zone cell by using the maximum cell radius (expressed by $c\_post$ [chip]) of the selected RE and an antenna height [m] of the selected RE, which are obtained in the parameter adjustment described above. The memory 25 (CF 39) is previously stored with the antenna height of each RE 12, and the mode switchover processing unit 31 uses the antenna height of the selected RE in the memory 25. For example, the tilt angle "$\theta\_post$" is obtained by the following formula (4).

$$\theta\_post = \tan^{-1}[\text{antenna height}/(c\_post/0.0129) \times 360/2\pi] \quad (4)$$

The mode switchover processing unit 31 obtains a tilt angle $\theta\_pre$ [°] before the parameter adjustment from a cell radius (expressed by $c\_pre$ [chip]) of the selected RE before the parameter adjustment by use of the following formula (5). Then, the mode switchover processing unit 31 obtains an adjustment angle $\theta\_diff$ [°] defined as a difference between $\theta\_post$ and $\theta\_pre$ (refer to the formula (6)).

$$\theta\_pre = \tan^{-1}[\text{antenna height}/(c\_pre/0.0128)] \times 360/2\pi \quad (5)$$

$$\theta\_diff = \theta\_post - \theta\_pre \quad (6)$$

However, a value of the tilt angle $\theta\_pre$ may be stored beforehand in the memory 25 (CF 39), and the calculation of the adjustment angle may involve using the previously stored tilt angle $\theta\_pre$. Note that the tilt angle becomes larger as tilted more downward from a horizontal line. Hence, the antenna is adjusted in a downward direction (so as to increase the tilt angle) when the adjustment angle $\theta\_diff$ takes a positive value, but is adjusted in an upward direction (so as to decrease the tilt angle) when taking a negative value.

The mode switchover processing unit 31 transmits the control signal containing $\theta\_diff$ to the antenna tilt control unit 60 of the selected RE. The antenna tilt control unit 60 changes the tilt angle according to $\theta\_diff$ received from the REC 11. Note that the parameter adjustment and the antenna tilt adjustment are carried out per frequency group in a case where the base station apparatus 10 supports the plurality of frequency bands (frequency groups).

<Large Zone Cell Scheduling Mode>

Next, a "large zone cell scheduling mode" switched over in 006 of FIG. 10 will be described. The BB signal processing unit 27 includes a scheduler. The scheduler performs scheduling to allocate radio resources (which will hereinafter be also resources) on a shared data channel to the individual users (UEs 13 having transmission/reception data. Along with the switchover to the large zone cell mode of the selected RE, a scheduling mode corresponding to each UE connected to the cell (large zone cell 15) formed by the selected RE, is switched over to the large zone cell scheduling mode corresponding to the large zone cell mode.

The data storage memory 25 (CF 39) is stored beforehand with parameters "$RB_{l\text{-}mode}$", "$TTI_{l\text{-}mode}$" and "$TBS_{max\_l\text{-}mode}$" applied to the large zone cell scheduling mode. The mode switchover processing unit 31 reads these parameters from the memory 25, and gives the BB signal processing unit 27 an instruction for the BB signal processing unit 27 to operate as below in the "large zone cell scheduling mode".

<1> The number of RBs allocated to one UE is fixed to a number indicated by a value of "$RB_{l\text{-}mode}$".

<2> An allocation interval of the data to one UE is set equal to or larger than a value of "$TTI_{l\text{-}mode}$".

<3> A data size (Transport Block Size (TBS)) of the data allocated at one time to one UE is set equal to or smaller than a value of "$TBS_{max\_l\text{-}mode}$".

<4> For concentrating the resources on the large zone cell, the resources allocated in division to the plurality of REs 12 on a cell-by-cell basis, are allocated to the selected RE forming the large zone cell.

The "RB" is defined as a minimum allocation unit of the resources in LTE and LTE-A and is structured by "12 subcarriers×7 symbols" (one subcarrier=15 kHz). The transmission/reception data related to the single UE (User Equipment) 13 are mapped to the RB allocated to this UE 13, and are thus transmitted and received. The "TTI" is defined as a minimum time unit for the scheduling and corresponds to one sub-frame (1 ms). Normally, the RB is allocated to the UE 13 selected by the scheduling per sub-frame. The "TBS" is defined as a basic unit when executing the process such as transmitting the data.

The value of "$TTI_{l\text{-}mode}$" defines a predetermined period of time indicating an allocation interval (cycle) of the data to one UE 13. A value being larger than one sub-frame (1 ms) is set as the value of "$TTI_{l\text{-}mode}$". In the large zone cell mode, the next data allocation to each UE 13 is inhibited till a period of time indicated by the value of "$TTI_{l\text{-}mode}$" elapses since the data have been allocated at certain timing.

Further, a value of "$RB_{l\text{-}mode}$" indicates the number of RBs, which can be allocated to one UE 13, in the plurality of RBs disposed at a certain bandwidth. As the value of "$RB_{l\text{-}mode}$", a fixed value is set the fixed value being such that the plural RBs enabled to be disposed at, e.g., a certain bandwidth are allocated evenly to the plural UEs 13. For example, when the number of RBs disposed at the bandwidth of 5 MHz is "20" and when the value of "$RB_{l\text{-}mode}$" is set to, e.g., "4", the RBs can be allocated evenly to the five UEs.

A value of "$TBS_{max\_l\text{-}mode}$" indicates a maximum data quantity (data size) that can be allocated to one UE 13 within a predetermined period of time (time length) defined by the value of "$TTI_{l\text{-}mode}$" described above. A product of the value of "$TBS_{max\_l\text{-}mode}$" and the value of "$TTI_{l\text{-}mode}$" indicates a maximum transmission rate of each UE 13. The value of "$TTI_{l\text{-}mode}$" is set to a value to ensure the transmission rate enabling a certain communication service (e.g., a voice communication) to be implemented. A restriction is provided in the maximum transmission rate, thereby ensuring an environment in which each of the UEs 13 can implement a certain communication service (voice communication). Note that a proper data size being smaller than the value of "$TTI_{l\text{-}mode}$" may also be set for the communication service that can be implemented at a lower rate than for a certain communication service.

In the "large zone cell scheduling mode", the number of RBs allocated to one UE 13 is fixed by the value of "$RB_{l\text{-}mode}$". Hence, an upper limit is provided to the number of RBs that can be allocated. On the other hand, the allocation interval of the data to one UE 13 is expanded by an interval defined by the value of "$TTI_{l\text{-}mode}$". The number of UEs 13 connectable to the large zone cell 15 in the unit time (e.g., one sub-frame (1 ms)) can be thereby increased. Furthermore, the value of "$TBS_{max\_l\text{-}mode}$" restricts the data size that can be allocated at one time, whereby the maximum transmission rate within the predetermined period of time can be adjusted. Note that the predetermined period of time indicates a period of time defined by a predetermined time length containing the unit time.

<Monitor of Battery Status of RE>

Figure 18:
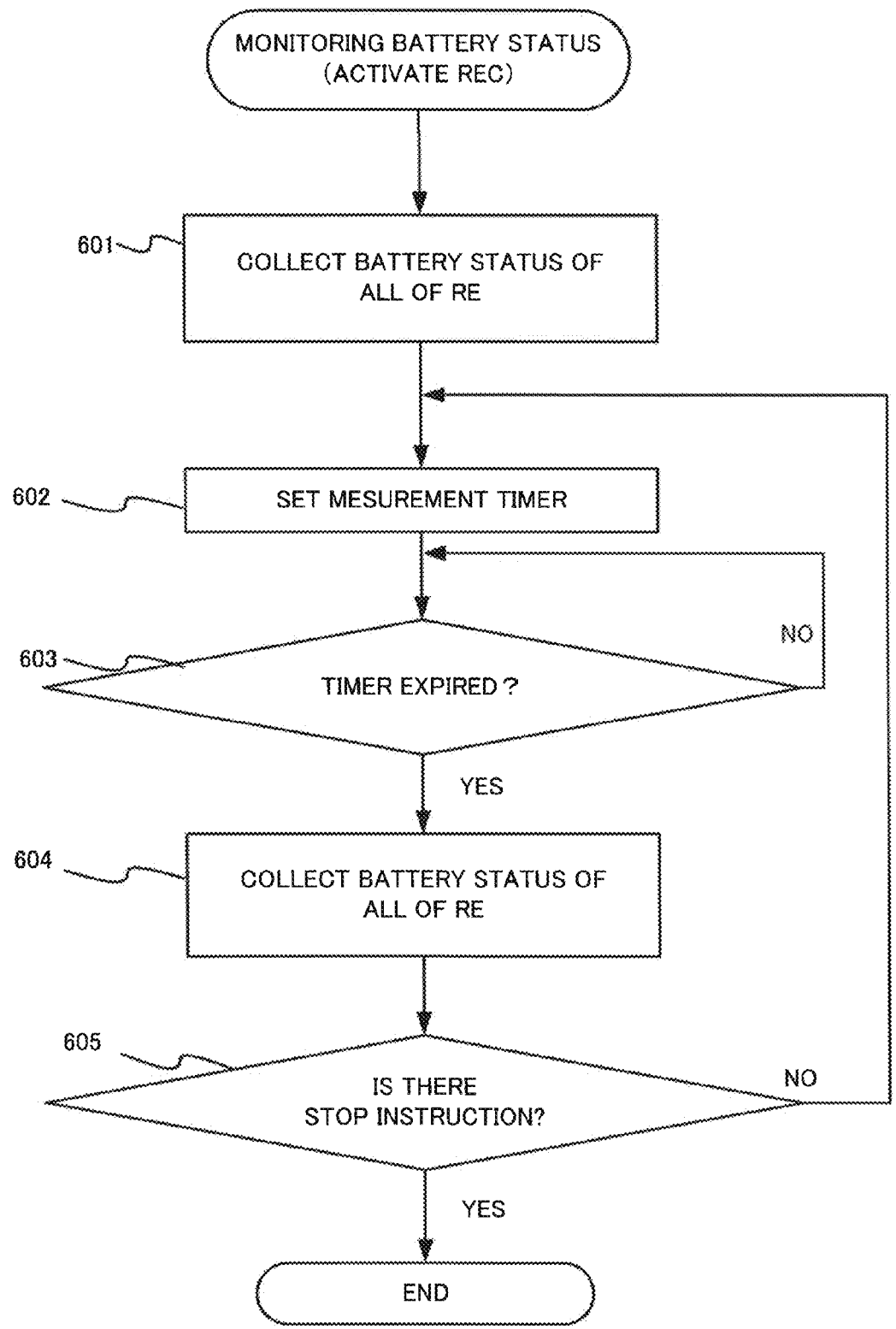
FIG. 18 is a flowchart illustrating an example of a battery status monitoring process.

Next, a battery status monitoring process by the RE battery status monitoring unit 32 (CPU 40) in relation to processes in 007A, 008 and 009 of FIG. 10, will be described. FIG. 18 is a flowchart illustrating an example of battery status monitoring process. The battery status monitoring process is executed independently of the switchover process (FIG. 10) to the large zone cell mode.

A start of processes illustrated in FIG. 18 is triggered by activation of the base station apparatus 10. In 601, the RE battery status monitoring unit 32 collects the battery statuses (the power source statuses and the battery residual quantities) of all the REs 12 connected to the REC 11. To be specific, the RE battery status monitoring unit 32 sends an instruction (report instruction) for reporting the battery statuses to the power source status monitoring units 59 of each of the REs 12, and receives the battery statuses of each of the REs 12, which are transmitted in response to the report instruction. The collected battery statuses of each of the REs 12 are stored in the DIMM 41 or the memory 25.

Thereafter, the RE battery status monitoring unit 32 starts a timer count to determine a monitor cycle of the battery status (602), and, upon reaching termination of the timer, (603, YES), collects again the battery status (604). Thus, when the battery statuses are collected as triggered by starting up the base station apparatus 10, thereafter the battery statuses of the REs 12 are collected at a fixed cycle based on the timer, and the stored battery statuses are updated according to the necessity.

The battery status is monitored continuously during the operation of the base station apparatus 10. When stopping the collection of the battery status in view of some circumstances, however, an instruction to stop the collection is given to the RE battery status monitoring unit 32 via, e.g., an unillustrated user interface or the network. In 605, when the RE battery status monitoring unit 32 detects the stop instruction, the battery status monitoring process is ended mandatorily.

The transfer and the reception of the battery status between the power source status monitoring unit 59 and the RE battery status monitoring unit 32, may also be done in a way that, e.g., the power source status monitoring unit 59 periodically (cyclically) reports the battery status to the RE battery status monitoring unit 32.

<Working Example>

Figure 19:
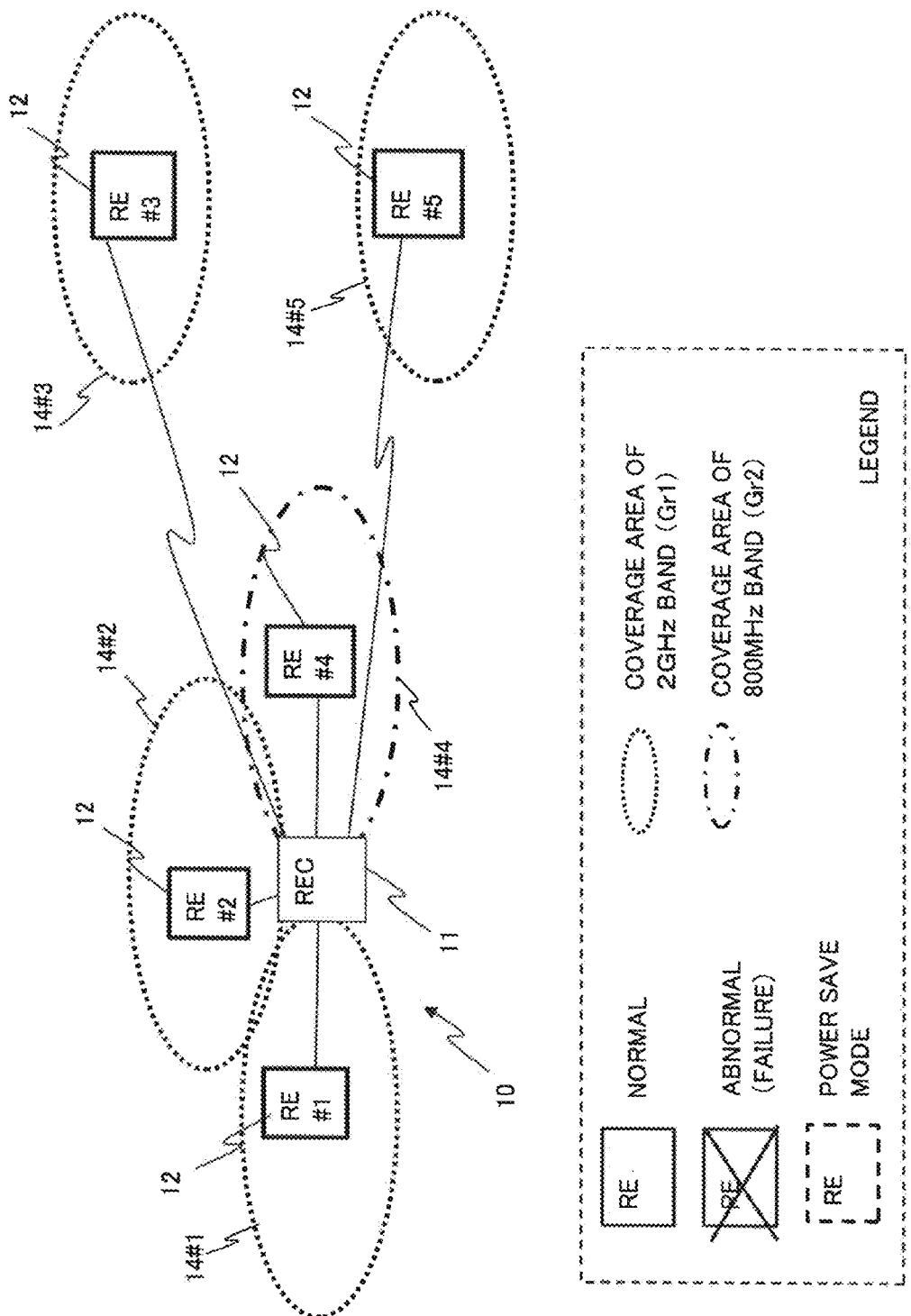
FIG. 19 illustrates an example of architecture of the base station apparatus (radio communication system) in a working example.

Next, a working example (Example) of the radio access system using the base station apparatus 10 described above will be described. FIG. 19 illustrates an example of the configuration of the base station apparatus 10 (the radio access system) in the Example. The base station apparatus 10 in Example has the configurations and the functions of the REC 11 and the RE 12 described so far. However, in the Example illustrated in FIG. 19, the base station apparatus 10 has five REs 12 (RE#1, RE#2, RE#3, RE#4, RE#5) by way of n-pieces (n=5) of REs 12 connected to the REC 11.

In the normal operation of the base station apparatus 10 depicted in FIG. 19, the RE#1 forms the normal cell 14#1, the RE#2 forms the normal cell 14#2, the RE#3 forms the normal cell 14#3, the RE#4 forms the normal cell 14#4, and the RE#5 forms the normal cell 14#5.

The CPRI cable lengths (lengths of the transmission paths between the REC and the REs) interconnecting the REC 11 and the RE#1 to RE#5 are as given in the following Table 1. Further, the cell radius of the normal cells #1 to #5 formed by the RE#1 to RE#5 are as given in the Table 2.

TABLE 1

Cable Length

| Item | Location | Length [km] | Delay on Cable [chip] |
|---|---|---|---|
| 1 | REC- RE#1 | 10.00 | 192.0 |
| 2 | REC- RE#2 | 5.00 | 96.0 |
| 3 | REC- RE#3 | 33.33 | 639.9 |
| 4 | REC- RE#4 | 1.00 | 19.2 |
| 5 | REC- RE#5 | 15.00 | 288.0 |

TABLE 2

Cell Radius

| Item | Location | Cell Radius [km] | Radio Wave Propagation Delay [chip] |
|---|---|---|---|
| 1 | REC- RE#1 | 10.00 | 128.0 |
| 2 | REC- RE#2 | 10.00 | 128.0 |
| 3 | REC- RE#3 | 10.00 | 128.0 |
| 4 | REC- RE#4 | 10.00 | 128.0 |
| 5 | REC- RE#5 | 10.00 | 128.0 |

As will be given in the following Table the RE#1, the RE#2, the RE#3 and the RE#5 use a 2 GHz band by way of an example of the frequency band f1. On the other hand, the RE#4 uses an 800 MHz band by way of an example of the frequency band f2. The 2 GHz band organizes the frequency group 1 (Gr1), while the 800 MHz band organizes the frequency group 2 (Gr2). Thus, in the Example, the plurality of REs 12 uses the plurality of frequency bands.

TABLE 3

Frequency Band

| Item | Location | Frequency Band | Frequency Group |
|---|---|---|---|
| 1 | RE#1 | 2 GHz band | Gr1 |
| 2 | RE#2 | 2 GHz band | Gr1 |
| 3 | RE#3 | 2 GHz band | Gr1 |
| 4 | RE#4 | 800 MHz band | Gr2 |
| 5 | RE#5 | 2 GHz band | Gr1 |

Further, the variety of parameters (such as the threshold value "NUM_RE_th" and the threshold value "REMAINING th") used in the processes illustrated in FIG. 10 are based on an assumption of using set values given in the following Table 4. An assumption of the present Example is that a value "3" is set as the threshold value "NUM_RE_th".

The memory 25 (CF 39) is previously stored with, e.g., data indicating the set values of the cable length, the cell radius, the frequency band and the variety of parameters given in Table 1 to Table 4. The CPU 40 functioning as the mode switchover processing unit 31 etc. reads the data required when executing the processes illustrated in FIG. 10 from the memory 25, and uses the readout data. Note that as to the antenna tilt angle in Table 4, "+direction" is downward. Moreover, an initial value (items 1-1, 1-2) of the maximum cable length, the initial value (items 3-1, 3-2) of the maximum cell radius can use the same values in the frequency group Gr1 and in the frequency group Gr2.

TABLE 4

Parameter Set Value

| Item | Name of Parameter | Set Value |
|---|---|---|
| 1-1 | Maximum cable Length Set Gr1 (Initial Value) | 640.0 [chip] |
| 1-2 | Maximum cable Length Set Gr2 (Initial Value) | 640.0 [chip] |
| 2 | Maximum Base Station Allowable Delay | 768.0 [chip] |
| 3-1 | Maximum Cell Radius Gr1 (Initial Value) | 128.0 [chip] |
| 3-2 | Maximum Cell Radius Gr2 (Initial Value) | 128.0 [chip] |
| 4 | NUM_RE_th | 3 [numbered] |
| 5 | REMAINING_th | 10 [%] |
| 6 | RE#1 Antenna Height | 50 [m] |
| 7 | RE#1 Antenna Tilt Angle | +0.20 [°] |
| 8 | RE#2 Antenna Height | 50 [m] |
| 9 | RE#2 Antenna Tilt Angle | +0.29 [°] |
| 10 | RE#3 Antenna Height | 50 [m] |
| 11 | RE#3 Antenna Tilt Angle | +0.29 [°] |
| 12 | RE#4 Antenna Height | 50 [m] |
| 13 | RE#4 Antenna Tilt Angle | +0.29 [°] |
| 14 | RE#5 Antenna Height | 50 [m] |
| 15 | RE#5 Antenna Tilt Angle | +0.29 [°] |
| 16 | $RB_{I\text{-}mode}$ Fixed | 4 [RB] |
| 17 | $TBS_{max\_I\text{-}mode}$ Fixed | 2000 [bit] |
| 18 | $TTI_{I\text{-}mode}$ Fixed | 20 [ms] |

Further, it is assumed that the operating statuses of RE#1 to RE#5 are respectively normal (normal status) as indicated in the following Table 5.

TABLE 5

Operating Status

| Item | Location | Operating Status | Remarks |
|---|---|---|---|
| 1 | RE#1 | Normal | |
| 2 | RE#2 | Normal | |
| 3 | RE#3 | Normal | |
| 4 | RE#4 | Normal | |
| 5 | RE#5 | Normal | |

Moreover, the battery statuses (initial statuses) of the RE#1 to RE#5 are given in the following Table 6. An assumption is that the RE#1 to RE#5 use the normal power source 61, and the battery remaining capacity of the battery 62 is 100%. Note that in the example illustrated in FIG. 6, the battery remaining capacity is managed based on a percentage against a full capacity. As a matter of course, the battery remaining capacity may also be managed based on an absolute value.

TABLE 6

Battery Status

| Item | Location | Power Source Status [Battery Used/Unused] | Battery remaining capacity [%] |
|---|---|---|---|
| 1 | RE#1 | Unused (Normal Power Source) | 100 |
| 2 | RE#2 | Unused (Normal Power Source) | 100 |
| 3 | RE#3 | Unused (Normal Power Source) | 100 |
| 4 | RE#4 | Unused (Normal Power Source) | 100 |
| 5 | RE#5 | Unused (Normal Power Source) | 100 |

The operating statuses given in Table 5 are monitored and collected by the CPRI connection status monitoring unit 29, and are stored in the DIMM 41 or the memory 25. The operating statuses are updated at the proper timing. Further, the battery statuses are, as illustrated in FIG. 18, collected by the RE battery status monitoring unit 32 and are stored in the DIMM 41 or the memory 25. The battery statuses are updated at the proper timing. The operating statuses and the battery statuses are referred to by the mode switchover processing unit 31 (CPU 40).

A description related to the switchover to the large zone cell mode will be made based on, as a premise, the normal operating statuses illustrated in FIG. 19 and given in Table to Table 6. As illustrated in FIG. 10, the switchover to the large zone cell mode is conducted when the number of the REs 12 in the normal status reaches the predetermined range (equal to or smaller than or less than the threshold value) due to occurrence of some kind of event. Typical events are exemplified by a variety of disasters including natural disasters such as an earthquake, afire and a tornado. Further, the events include events (e.g., a local congestion of users of the UEs 13) other than the natural disasters. Moreover, the events may include events such as a temporary stop of the operation of the RE 12 based on various circumstances in terms of the operation of the base station apparatus 10 and an exchange of the RE 12.

<<Scenario 1>>

Figure 20:
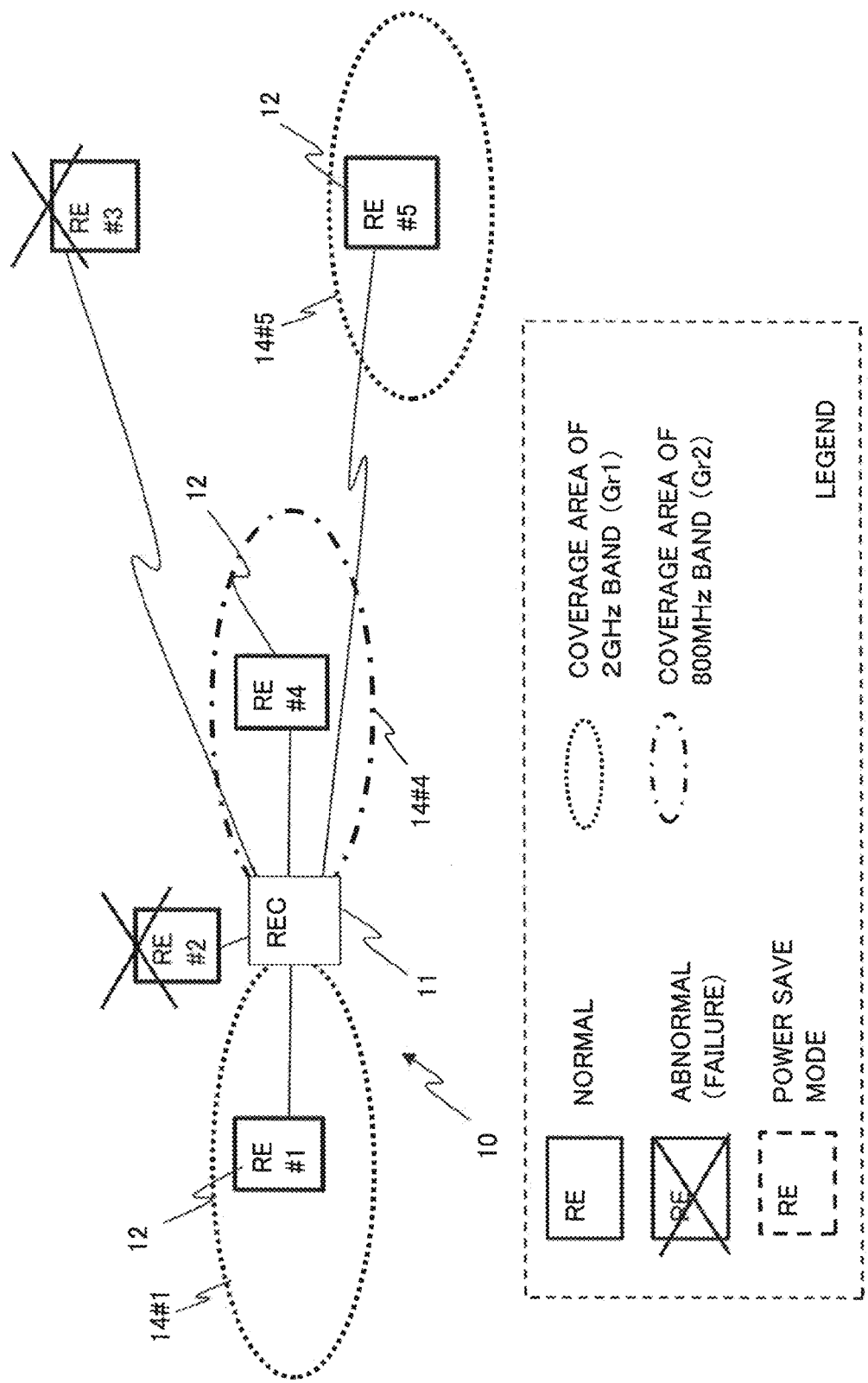
FIG. 20 illustrates an example of a status of the base station apparatus after occurrence of a disaster.

FIG. 20 illustrates an example of the status of the base station apparatus 10 disabled from operating normally due to the occurrence of the event. For example, it is assumed that the RE#2 and the RE#3 get into the failure and become the abnormal status due to the occurrence of the disaster, resulting in the status where the normal cell 14#2 and the normal cell 14#3 are not formed. Moreover, it is assumed that the RE#1, the RE#4 and the RE#5 are in the normal status, however, such a status arises due to, e.g., a service interruption. Then, it is also assumed that the operating statuses (status information) of each of the REs 12 monitored by the REC 11 come to have contents given in the following Table 7, and the battery statuses of each of the REs 12 monitored by the REC 11 come to have contents given in the following Table 8.

TABLE 7

Operating Status

| Item | Location | RE Operating Status | Remarks |
|---|---|---|---|
| 1 | RE#1 | Normal | |
| 2 | RE#2 | Operation Continuation Disabled (Abnormal) | |
| 3 | RE#3 | Operation Continuation Disabled (Abnormal) | |
| 4 | RE#4 | Normal | |
| 5 | RE#5 | Normal | |

TABLE 8

Battery Status

| Item | Location | Power Source Status [Battery Used/Unused] | Battery Remaining capacity [%] |
|---|---|---|---|
| 1 | RE#1 | Used (Battery) | 100 |
| 2 | RE#2 | — | — |
| 3 | RE#3 | — | — |
| 4 | RE#4 | Used (Battery) | 100 |
| 5 | RE#5 | Used (Battery) | 100 |

Thereupon, the mode switchover processing unit 31 (CPU 40) refers to the operating statuses as given in Table 7 and obtains the number "3" of the normal REs 12 in 001 of FIG. 10. As a result, the mode switchover processing unit 31 detects that the number of the normal REs 12 becomes equal to or smaller than the threshold value "NUM_RE_th (=3)", and hereafter executes the process of the switchover to the "large zone cell mode".

<<Scenario 2>>

The mode switchover processing unit 31 generates (creates) the selection permutation list in 003 of FIG. 10, and executes the processes illustrated in FIGS. 11 and 13. Table illustrates a processing result of the "high-order group/low-order group classification" (FIG. 13) on the basis of the statuses of each of the REs 12 depicted in FIG. 20.

TABLE 9

Selection Permutation List (High-Order Group/Low-Order Group Classification)

| | Gr1 | Gr2 |
|---|---|---|
| High-Order Group | — | — |
| Low-Order Group | RE#1, RE#5 | RE#4 |

As given in Table 9, the normal RE#1 and RE#5 belonging to the frequency group Gr1 (2 GHz band) use the battery 62 and are therefore classified into the group subordinate to the frequency group Gr1. The normal RE#4 belonging to the frequency group Gr2 (800 MHz band) uses the battery 62 and is therefore classified into the group subordinate to the frequency group Gr2.

In the Example, all the normal RE#1, RE#4 and RE#5 use the battery, and hence the RE 12 of the high-order group does not exist in both of the frequency group Gr1 and the frequency group Gr2.

<<Scenario 3>>

The mode switchover processing unit 31 executes the "sorting" process illustrated in FIG. 15, thereby generating a final version of the selection permutation list. Table 10 depicts a result of the sorting process. With respect to the low-order group of the frequency group Gr1, the cable length of the RE#1 is shorter than the cable length of the RE#5. Hence, as represented in Table 10, the mode switchover processing unit allocates a permutation number "1" to the RE#1 and a permutation number "2" is allocated to the RE#5. With respect to the frequency group Gr2, only the RE#4 belongs the low-order group. Hence, the permutation number "1" is allocated to the RE#4. The selection permutation list illustrated in Table 10 is stored in, e.g., the DIMM 41 or the memory 25 (CF 39) and is referred to by the CPU 40.

TABLE 10

Selection Permutation List (After Sort, Final Version)

|  | Permutation | Gr1 | Gr2 |
|---|---|---|---|
| High-Order Group | — | — | — |
| Low-Order Group | 1 | RE#1 | RE#4 |
|  | 2 | RE#5 | — |

<<Scenario 4>>

The mode switchover processing unit 31 (CPU 40) refers to the selection permutation list (Table 10) and thus selects the RE 12 (selected RE) forming the large zone cell per frequency group (004 in FIG. 10). The mode switchover processing unit 31 selects (determines), as the selected RE, the RE#1 being ranked highest in the selection permutation list with respect to the frequency group Gr1. Further, the mode switchover processing unit 31 selects (determines) the RE#4 as the selected RE with respect to the frequency group Gr2.

<<Scenario 5>>

The mode switchover processing unit 31 executes the parameter adjustment (005 in FIG. 10, FIG. 17) about the cell radius of the selected RE (RE#1, RE#4). Initially, to start with, the maximum cell radius is calculated. The following is an example of adjusting the cell radius of the RE#1 serving as the selected RE of the frequency group Gr1. The maximum base station allowable delay is 768.0 [chip] (Table 4), and the cable length of the RE#1 is 192.0[chip] (Table 1). The mode switchover processing unit 31 calculates the maximum cell radius by use of the formula (2). As a result, the maximum cell radius is calculated at 576.0 [chip] (=768.0−192.0). Moreover, the mode switchover processing unit 31 calculates the radio wave propagation distance at 45.00[km] by using the formula (3).

The an example of adjusting the cell radius of the RE#4 serving as the selected RE of the frequency group Gr2. The maximum base station allowable delay is 768.0[chip] (Table 4), and the cable length of the RE#4 is 19.2[chip] (Table 1). The mode switchover processing unit 31 calculates the maximum cell radius of the frequency group Gr2 at 748.8 [chip] (=768.0−19.2) by use of the formula (2). Subsequently, the mode switchover processing unit 31 calculates the radio wave propagation distance at 58.50[km] by using the formula (3).

<<Scenario 6>>

The mode switchover processing unit 31 adjusts the antenna tilts (tilt angles) of the RE#1 and the RE#4 by using the maximum cell radius obtained in the scenario 5. The mode switchover processing unit 31, when adjusting the tilt angle, uses the pre-adjusting antenna tilt angle ($\theta\_pre$ [°]) and the antenna height as given in Table 4, which are stored beforehand in the memory 25.

Figure 21:
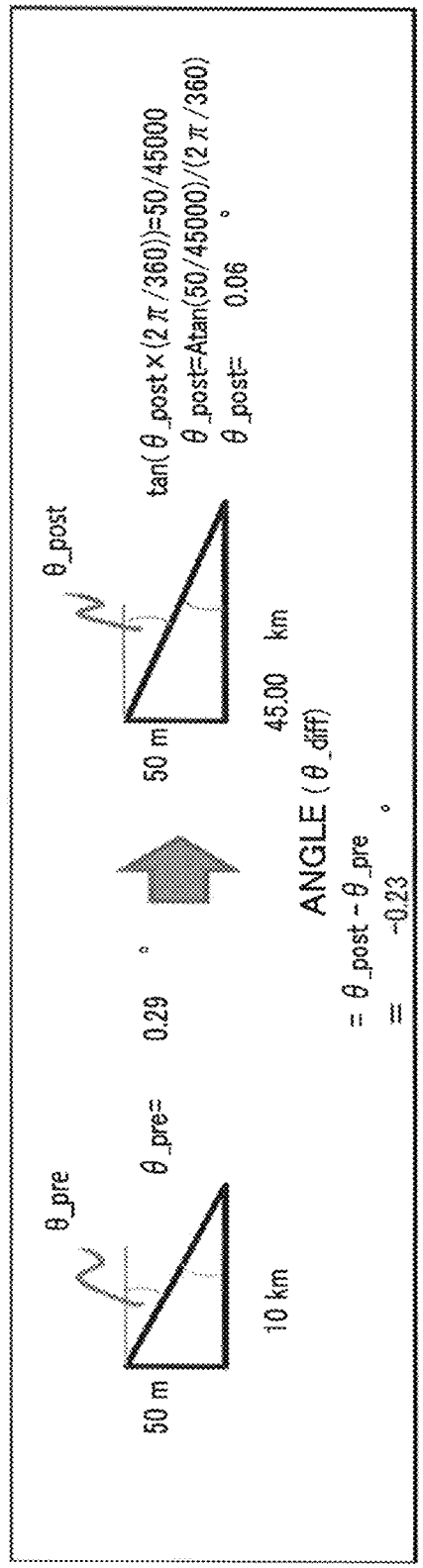
FIG. 21 is an explanatory diagram of adjusting an antenna tilt in a frequency group Gr1.

FIG. 21 is an explanatory diagram of an example of adjusting the tilt angle with respect to the RE#1 as the selected RE of the frequency group Gr1. As given in Table 4, the antenna height of the RE#1 is 50 m], and the pre-adjusting antenna tilt angle $\theta\_pre$ is 0.29[°]. The mode switchover processing unit 31 calculates the cell radius of the RE#1 at 576.0[chip] as in the scenario 5 and also calculates the post-adjusting antenna tilt angle $\theta\_post$ by employing the formula (5) described above. Herein, a value of the post-adjusting antenna tilt angle $\theta\_post$ becomes 0.06[°]. Subsequently, the mode switchover processing unit 31 substitutes the value of $\theta\_pre$ and the value of $\theta\_post$ into the formula (6) to calculate the adjustment angle $\theta\_diff$. Herein, a value of $\theta\_diff$ becomes −0.23 [°].

The mode switchover processing unit 31 or the antenna control unit 30 receiving an instruction from the mode switchover processing unit 31 sends a control instruction (tilt angle change instruction) containing $\theta\_diff$ to the antenna tilt control unit 60 of the RE#1. The antenna tilt control unit 60 of the RE#1 lifts the antenna at 0.23[°] because of the value of $\theta\_diff$ being negative.

Figure 22:
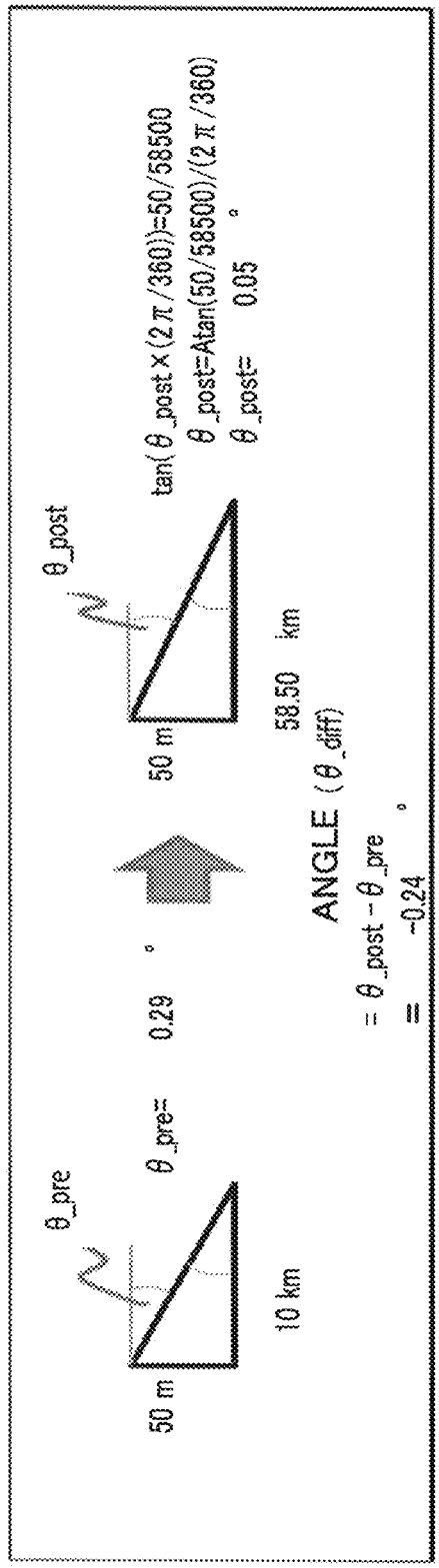
FIG. 22 is an explanatory diagram of adjusting the antenna tilt in a frequency group Gr2.

FIG. 22 is an explanatory diagram of an example of adjusting the tilt angle with respect to the RE#4 as the selected RE of the frequency group Gr2. As given in Table 4, the antenna height of the RE#4 is 50[m], and the pre-adjusting antenna tilt angle $\theta\_pre$ is 0.29[°]. The mode switchover processing unit 31 calculates the cell radius of the RE#4 at 748.8[chip] as obtained in the scenario 5 and also calculates the post-adjusting antenna tilt angle $\theta\_post$ by employing the formula (5) described above. Herein, a value of the post-adjusting antenna tilt angle $\theta\_post$ becomes 0.05[°]. Subsequently, the mode switchover processing unit 31 substitutes the value of $\theta\_pre$ and the value of $\theta\_post$ into the formula (6) to calculate the adjustment angle $\theta\_diff$. Herein, a value of $\theta\_diff$ becomes −0.24[°].

The mode switchover processing unit 31 or the antenna control unit 30 receiving the instruction from the mode switchover processing unit 31 sends the control instruction (tilt angle change instruction) containing $\theta\_diff$ to the antenna tilt control unit 60 of the RE#1. The antenna tilt control unit 60 of the RE#1 lifts the antenna at 0.24[°] because of the value of $\theta\_diff$ being negative.

Note that the mode switchover processing unit 31 or the antenna control unit 30 (REC 11) sends the value of $\theta\_pre$ and the value of $\theta\_post$ to the selected RE, and the antenna control unit 30 of the selected RE may execute the processes from the calculation of $\theta\_diff$ onward. In this case, the selected RE may previously store the value of $\theta\_pre$.

<<Scenario 7>>

The mode switchover processing unit 31 executes the process of switching over the scheduling mode of the BB signal processing unit 27 to the "large zone cell mode" (006 in FIG. 10). Namely, the mode switchover processing unit 31 controls, by using the parameters "$RB_{l\text{-}mode}$", "$TBS_{max\_l\text{-}mode}$" and "$TTI_{l\text{-}mode}$" given in the items 16, 17 and 18 of Table 4, so that the scheduler of the BB signal processing unit 27 performs the following scheduling operations.

The number of the RBs allocated to the same user (UE 13) is fixed to "4".

The data size (TBS) allocated at one time is restricted to 2000[bit] at maximum.

The allocation interval of the data to the same user (UE 13) is set to 20[ms]. Namely, when the data are once allocated, the data are inhibited from being allocated to the same user till an elapse of 20[ms].

Owing to the scheduling operations that follow what has been described above, as given in the formula (7) given below, the maximum transmission rate per user (UE 13) in the predetermined period of time (20 ms in the Example) is restricted to 100[kbps].

$$2000[\text{bit}]/20[\text{ms}]=100[\text{kbps}] \quad (7)$$

On the other hand, the number of the connectable UEs 13 per unit time (1 ms=TTI) is given as follows. For example, the number of RBs when the bandwidth is 5 MHz is assumed to be "20". The number of RBs per UE 13 is "4", and hence the five UEs 13 can be connected per unit time (20[RB]/4[RB/UE]=5 [UE]).

Furthermore, the number of RBs when the bandwidth is 10 MHz is assumed to be "40". In this case, the ten UEs 13 can be connected per unit time (40[RB]/4[RB/UE]=10 [UE]). Moreover, the number of RBs when the bandwidth is 15 MHz is assumed to be "60". In this case, the fifteen UEs 13 can be connected per unit time (60[RB]/4[RB/UE]=15 [UE]). Still further, the number of RBs when the bandwidth is 20 MHz is assumed to be "80". In this instance, the twenty UEs 13 can be connected per unit time (80[RB]/4[RB/UE]=20 [UE]).

Then, the number of users (UEs 13), which can be processed within the predetermined period of time based on the value (20 ms) of "$TTI_{l-mode}$" is given as below:
Bandwidth 5 MHs: 5×20=100[UE]
Bandwidth 10 MHs: 10×20=200[UE]
Bandwidth 15 MHs: 15×20=300[UE]
Bandwidth 20 MHs: 20×20=400[UE]

The transmission rate required for the voice communication is generally 12 [kbps] (AMR (Adaptive Multi-Rate) voice call communication speed in W-CDMA). Therefore, when the maximum transmission rate is 100[kbps], the voice communication can be sufficiently performed. Each of the UEs 13 connected to the large zone cell 15 can be thereby provided with the environment enabled to perform the voice communication at an impartial transmission rate.

<<Scenario 8>>

The mode switchover processing unit 31 sets the REs 12 excluding the selected RE in the power save mode (FIG. 10, 007). In Example, the mode switchover processing unit 31 issues a power save mode instruction to the RE#2, the RE#3 and the RE#5. The control signal containing the power save mode instruction is converted into the CPRI signal by the CPRI signal processing unit 26, and the CPRI signal is transmitted to RE#2, the RE#3 and the RE#5.

In the RE#5, the CPRI signal processing unit 51 reconverts the CPRI signal back into the control signal. At this time, the CPRI signal processing unit 51 determines that the control signal contains the power save mode instruction, and gives the power save mode instruction to the monitor control unit 58. The monitor control unit 58, upon receiving the power save mode instruction, stops supplying the power to the power save control range A, or reduces the power supply quantity, thus setting the power save mode. This power save mode enables the quantities of the power consumptions of the non-selected RE to be restrained. Especially when the non-selected RE (RE#5) existing in the selection permutation list uses the battery 62, a decreasing speed of the remaining capacity of the battery 62 can be restrained.

Note that the RE#2 and the RE#3 are in the abnormal status, and hence a determination as to whether a transition to the power save mode can be made or not, depends on a content of the abnormality (failure). Accordingly, the transmission of the power save mode instruction to the RE 12 in the abnormal status leads to a trial of the transition to the power save mode instruction.

Figure 23:
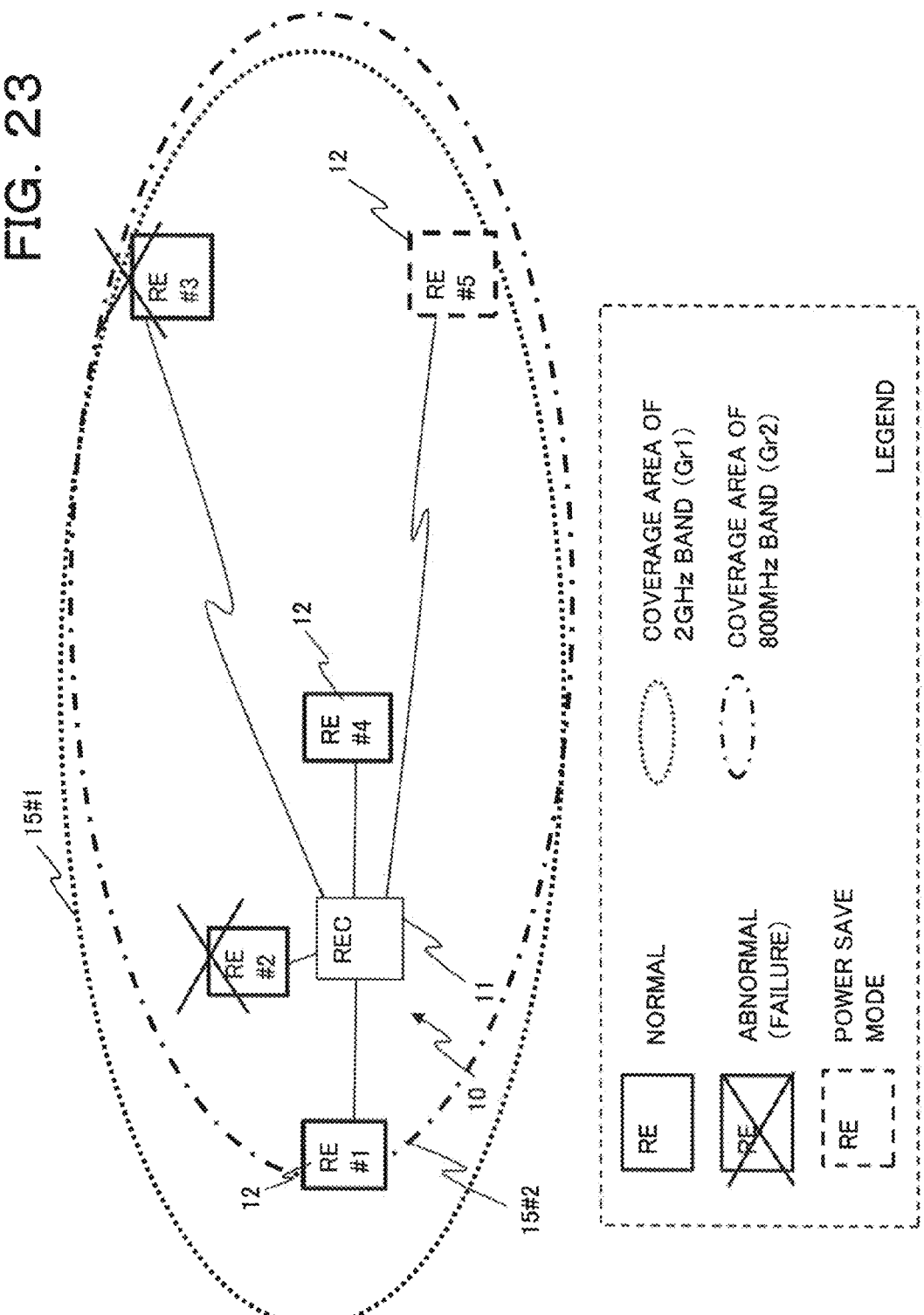
FIG. 23 illustrates a status after selected RE has been switched over to the large zone cell mode.

FIG. 23 depicts the status of the radio access system after finishing the scenario 8, and illustrates a situation after the RE#1 and the RE#4 have been switched over to the large zone cell mode. The RE#1 forms a large zone cell 15#1 of 2 GHz (Gr1). The large zone cell 15#1 covers the communication areas (coverage areas) of the normal cell 14#2 of the RE#2, the normal cell 14#3 of the RE#3 and the normal cell 14#5 of the RE#5. Further, the RE#4 forms a large zone cell 15#2 of 800 MHz (Gr2), and the coverage area of 800 MHz is expanded. Note that FIG. 23 illustrates an example in which only the RE#5 transitions to the power save mode.

<<Scenario 9>>

The mode switchover processing unit 31 monitors the battery statuses of the RE#1 and the RE#4 serving as the selected REs (FIG. 10, 008, FIG. 13). However, the mode switchover processing unit 31 monitors the battery statuses of not only the selected REs but also all the REs 12 connected to the REC 11.

The mode switchover processing unit 31 can, as described above, share (refer to) the information indicating the battery statuses of each of the REs 12 with the RE battery status monitoring unit 32 managing these battery statuses. The mode switchover processing unit 31 refers to the battery statuses of, e.g., the RE#1 and the RE#4 as the selected REs in the information indicating t the battery statuses of each of the REs 12. Table 11 illustrates an example of the battery statuses of the RE#1 and the RE#4, these statuses being referred to by the mode switchover processing unit 31.

TABLE 11

Battery Statuses Referred to by Mode Switchover Processing Unit

| Item | Location | Power Source Status [Battery Used/Unused] | Battery remaining capacity [%] |
|---|---|---|---|
| 1 | RE#1 | Used (Battery Power Source) | 9 |
| 4 | RE#4 | Used (Battery Power Source) | 20 |

<<Scenario 10>>

The mode switchover processing unit 31 compares the battery remaining capacity of each of the RE#1 and the RE#4 with the threshold value "REMAINING th (10[%])" (FIG. 10, 009). At this time, the battery remaining capacity of the RE#4 exceeds the threshold value, and therefore the operation continues in status quo. While on the other hand, the battery remaining capacity of the RE#1 becomes equal to or smaller than (or becomes less than) the threshold value. Consequently, the mode switchover processing unit 31 executes an update process so as to delete the RE#1 out of the selection permutation list (FIG. 10, 010). With this update process, the RE#5 having the permutation number "2" (Table 10) becomes the RE 12 being ranked highest.

The mode switchover processing unit 31 executes the processes in 005 to 0011 in FIG. 10 in a way that targets on the RE#5. Namely, the operation is carried out with the large zone cell 15 formed by the RE#5 with respect to the frequency group Gr1.

It is to be noted that Example described above does not present any data because of being unable to receive the battery statuses from the REs 12 (RE#2, RE#3) in the abnormal status (Table 8). This being utilized, the following modification can be attained. To be specific, the RE battery status monitoring unit 32, with respect to the RE 12 from which the normal battery status cannot be received, sets the value of the battery status of this RE 12 to a predetermined special value (e.g., Null). The mode switchover processing unit 31, when referring to the battery statuses of the RE#1 and the RE#4 and when any one of the values becomes the special value, deems that the RE 12 (e.g., RE#1) is in the abnormal status, and executes updating the selection permutation list and reselecting the RE.

<Operational Effect of Embodiment>

According to the embodiment embracing the working example (Example) described above, when the monitoring result of the plurality of REs 12 satisfies the predetermined condition, the RE 12 operating with the large zone cell mode is selected, and this RE 12 is switched over to the large zone cell mode. The RE 12 operating with the large zone cell mode can be thereby dynamically selected.

In the embodiment, by way of the example, when the number of (normal) REs 12 indicating the normal status becomes equal to or smaller than or becomes less than the threshold value as a result of monitoring the statuses (normal/abnormal) of the REs 12, the RE 12 operating with the large zone cell mode is selected from within the REs 12 indicating the normal status. With this contrivance, out of the remaining normal REs 12, the RE 12 (forming the large zone cell) operating with the large zone cell mode can be operated.

This contrivance enables the RE 12 forming the large zone cell 15 to be dynamically selected from within the remaining normal REs 12 even when one or two or more REs 12 in the plurality of REs 12 get into the failure at the same timing due to the occurrence of, e.g., the disaster etc. Accordingly, as far as all of the REs 12 do not become abnormal, the large zone cell 15 can be formed. It is to be noted that the monitoring contents and the starting condition of the selecting operation of the RE 12, which have been demonstrated in the embodiment, are exemplifications, and other contents and conditions different from the exemplifications in the embodiment can be adopted.

The large zone cell is formed to cover at least apart of each of the cells formed by the plurality of REs 12. The area of the cell formed by, e.g., the RE 12 having a failure can be thereby covered by the large zone cell, and the communication can be performed by using the large zone cell in the area with the failure RE 12 not forming the cell.

Further, in the embodiment, the selected RE is dynamically selected from the REs 12 being normal on the basis of the environmental information (the information representing the operating environment of the RE 12 such as the power source statuses and the cable lengths) of the normal REs 12. It is thereby feasible to select the RE 12 with the operating environment being suitable for forming the large zone cell from within the remaining normal REs 12.

When selecting the selected RE, the RE 12 using the normal power source 61 is selected preferentially rather than the RE 12 using the battery 62. Moreover, from among the REs 12 using the battery 62, the RE 12 having the larger battery remaining capacity is preferentially selected. It is thereby possible to elongate the operating time (duration) of the large zone cell 15 formed by the selected RE.

Moreover, when selecting the selected RE, from among the REs 12 using the normal power source 61, the RE 12 having shorter cable length between the REC 11 and the RE 12 is selected. In the parameter adjustment related to the cell radius (FIG. 17), the maximum cell radius c of the large zone cell 15 is calculated by subtracting the maximum cable length a from the maximum base station allowable delay b (refer to the formula (2)). It is therefore feasible to enlarge the cell radius of the large zone cell 15 by preferentially selecting the RE 12 having the shorter cable length.

This contrivance enables enhancement of such a possibility that the large zone cell covers a communication area of the RE 12 having the abnormal status and the RE 12 operating with the power save mode. Thus, by forming the large zone cell 15 by the selected RE, a reduction of the communication area (coverage area) of the base station apparatus 10 can be inhibited.

It is to be noted that the maximum base station allowable delay given when in the normal operation is used as the predetermined value (b's value) from which to calculate the maximum cell radius c in Example. However, a value different from the maximum base station allowable delay may also be applied. For example, a value to attain a desired value of the cell radius of the large zone cell 15 may be previously stored and be used when calculating the cell radius of the new large zone cell 15. Note that the predetermined value is set by taking the tilt angle into consideration.

Moreover, when the plurality of REs 12 uses the plurality of frequency bands, the switchover to the large zone cell mode is carried out per frequency band (frequency group). Through this switchover, the large zone cell 15 can be formed per frequency band.

At this time, as demonstrated in Example, even when there is one RE 12 using a certain frequency band (frequency group) in the normal operating status, the switchover to the large zone cell mode, targeting on this RE 12, is carried out. Accordingly, when the number of normal REs 12 reaches the predetermined range, the communication area concerned with the RE 12 is expanded. With this expansion, for instance, when forming a peripheral (neighboring) cell around the normal cell 14#4 is stopped due to the disaster etc., the UE 13 being in the communication area of the peripheral cell and using the 800 MHz band can perform the communication by use of the large zone cell 15#2.

Furthermore, according to the embodiment, the selection permutation list indicating the selecting sequence of the REs 12 to be switched over to the large zone cell mode is created. When the RE 12 operating with the large zone cell mode does not continue the operation with the large zone cell mode, the RE 12 corresponding to the next selected RE in the selection permutation list is switched over to the large zone cell mode.

Thus, the next RE 12 can be promptly switched over to the large zone cell mode (the RE 12 forming the large zone cell 15 can be promptly changed), and it is possible to continue the operation of the base station apparatus 10 using the large zone cell 15. Note that when the next RE 12 is selected from the selection permutation list, it is determined whether the status of this RE 12 is normal or abnormal. When the status of the RE 12 is abnormal, a further next RE 12 may be selected by skipping the selection of the former RE 12.

In the discussion made above, when the battery remaining capacity of the RE 12 switched over to the large zone cell mode becomes equal to or smaller than the threshold value and when the status of this RE 12 becomes "abnormal", it is determined that "the RE 12 becomes a state that the operation with the large zone cell mode cannot continue", and the switchover to the next RE 12 is conducted. However, the switchover to the next RE 12 may also be executed when "detecting failures with respect to continuity of operation with the large zone cell mode". Namely, the switchover to the next RE 12 is made not only in a case where "the RE 12 becomes a state that the RE 12 cannot continue the operation with the large zone cell mode" but also in a case where a sign that the RE 12 becomes a state that the RE 12 cannot continue the operation with the large zone cell mode is detected".

For example, the threshold value for the battery remaining capacity is set based on a value corresponding to the "sign" rather than a value of the battery remaining capacity that the RE 12 cannot continue the operation with the large zone cell mode. Thereby, the switchover of the RE 12 in consideration with the "sign" is enabled.

For example, it may determine that a status of a certain RE 12 is "abnormal" when at least one of the monitoring unit 28 and the CPRI connection status monitoring unit 29 detects an event becoming the "sign" with respect to the certain RE 12. In other words, events becoming the "sign" may be included in events determined as "abnormal" in order to detect the "failures with respect to continuity of operation with the large zone cell mode". In this case, considering the "sign" ranges to determining of the switchover from the normal mode to the large zone cell mode (namely, selection of RE 12 operating with the large zone cell mode). Thereby, it can exclude an RE 12 having the "sign" from selection candidates.

Alternatively, the switchover to the next RE 12 may be done when at least one of the monitoring unit 28 and the CPRI connection status monitoring unit 29 detects an event becoming the "sign" of the abnormality different from the event from which to determine the "abnormality". In this case, timing of the switchover to the next RE 12 can be earlier, and it is possible to avoid such a state that the large zone cell cannot be formed due to the occurrence of the event from which to determine the abnormality.

Moreover, on the occasion of the switchover to the large zone cell mode, the change to the "large zone scheduling mode" is conducted. At this time, with respect to the selected RE (the large zone cell 15), the scheduling mode is changed so that the number of the connectable UEs 13 per predetermined period of time increases over the number of the connectable UEs 13 before the switchover to the large zone cell mode. It is thereby feasible to support, e.g., such a situation that, in the large zone cell mode, many users desire to use the UEs 13 within a certain period of time.

Further, on the occasion of the change to the scheduling mode, the upper limit is provided to the data size that can be transmitted per predetermined period by each UE 13. This upper limit being provided, the impartial communication environment can be provided to each of the UEs 13. Moreover, a data size, with which the predetermined communication service (e.g., the voice communication) can be implemented, is set as the upper limit. The voice communication enabled environment can be impartially provided to the users of each of the UEs 13 connected to the large zone cell 15.

It is to be noted that the number of the normal REs 12 to be compared with the threshold value "NUM_RE_th" is used irrespective of the distinction between the frequency groups in Example described above. In place of this usage thereof, the number of normal REs 12 may be managed per frequency group, and the determination and the process of the switchover to the large zone cell mode may be executed on a per frequency group basis. For example, in Example described above, the following management can be made.

To be specific, only the number of normal REs 12 belonging to the frequency group Gr1 is managed, while the RE 12 belonging to the frequency group Gr2 is not managed because of its number being "1". Then, when the number of normal REs 12 with respect to the frequency group Gr1 is equal to or smaller than the threshold value, the switchover to the large zone cell mode for only the frequency group Gr1 is carried out. As a result, with respect to frequency group Gr2, the operation in the normal cell continues.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio access system, comprising:
   a plurality of radio apparatuses each configured to form a cell; and
   a radio control apparatus configured to control the plurality of radio apparatuses, the radio control apparatus including:
   a controller configured to execute processes including:
   monitoring the plurality of radio apparatuses;
   selecting, from within the plurality of radio apparatuses, a radio apparatus to be operated with a large zone cell mode to form a large zone cell being larger than the cell when a monitoring result satisfies a predetermined condition; and
   switching over the selected radio apparatus to the large zone cell mode,
   wherein the large zone cell is used instead of at least one cell that is not formed by one or more radio apparatuses other than the selected radio apparatus, and the one or more radio apparatuses other than the selected radio apparatus have a failure,
   wherein the one of the plurality of radio apparatuses which operates with the large zone cell mode is configured to form a large zone cell having an area including a cell of at least a part of the plurality of radio apparatuses; and
   wherein the radio control apparatus is configured to transmit a control signal to make remaining radio apparatuses other than the one of the plurality of radio apparatuses to be operated with the large zone cell mode switch over to a power save mode to stop forming of a cell covered by the large zone cell.

2. The radio access system according to claim 1, wherein the controller is configured to monitor whether a status of each of the plurality of radio apparatuses is normal or abnormal, and is configured to select a radio apparatus to be operated with the large zone cell mode from within one or more radio apparatuses each indicating the normal status when a number of radio apparatuses indicating the normal status reaches a predetermined range.

3. The radio access system according to claim 1, wherein the controller is configured to select the radio apparatus to be operated with the large zone cell mode based on an operating environment of each of the plurality of radio apparatuses.

4. The radio access system according to claim 1, wherein:
each of the plurality of radio apparatus operates by use of one of a normal power source and a battery; and
the controller is configured to preferentially select a radio apparatus operating by use of the normal power source rather than a radio apparatus operating by use of the battery when selecting the radio apparatus operating with the large zone cell mode.

5. The radio access system according to claim 1, wherein the controller is configured to select a radio apparatus having a shorter length of a transmission path from within the plurality of radio apparatuses when selecting the radio apparatus to be operated with the large zone cell mode.

6. The radio access system according to claim 1, wherein the controller is configured to select a radio apparatus having a larger battery remaining capacity from within two or more radio apparatuses each operating by use of a battery when selecting the radio apparatus to be operated with the large zone cell mode.

7. The radio access system according to claim 1, wherein when there are two or more frequency bands used by the plurality of radio apparatuses, the controller is configured to select the radio apparatus to be operated with the large zone cell mode with respect to each of the two or more frequency bands to switch over each of the selected radio apparatuses to the large zone cell mode.

8. The radio access system according to claim 1, wherein the controller is configured to generate a list to determine a selecting sequence of the radio apparatus to be operated with the large zone cell mode, and is configured to switch over a radio apparatus that is selected next on the list to the large zone cell mode when detecting a failure relating to continuity of operation with the large zone cell mode with respect to the radio apparatus switched over to the large zone cell mode according to the list.

9. The radio access system according to claim 1, wherein the controller is configured to change a scheduling mode of the selected radio apparatus for allocating radio resources to each radio terminal connected to the selected radio apparatus so that a number of radio terminals connectable to the selected radio apparatus per predetermined period of time increases over a number of terminals connectable to the selected radio apparatus before the switchover to the large zone cell mode.

10. The radio access system according to claim 9, wherein the controller is configured to change the scheduling mode so that an upper limit is provided to a data size that can be transmitted per predetermined period of time with respect to each terminal connected to the selected radio apparatus.

11. The radio access system according to claim 10, wherein the upper limit is set by a data size with which to enable a predetermined communication service.

12. A radio control apparatus controlling a plurality of radio apparatuses each forming a cell, the radio control apparatus comprising:
a controller configured to execute processes including:
monitoring the plurality of radio apparatuses;
selecting, from within the plurality of radio apparatuses, a radio apparatus to be operated with a large zone cell mode to form a large zone cell being larger than the cell when a monitoring result satisfies a predetermined condition; and
switching over the selected radio apparatus to the large zone cell mode,
wherein the large zone cell is used instead of at least one cell that is not formed by one or more radio apparatuses other than the selected radio apparatus, and the one or more radio apparatuses other than the selected radio apparatus have a failure,
wherein the one of the plurality of radio apparatuses which operates with the large zone cell mode is configured to form a large zone cell having an area including a cell of at least a part of the plurality of radio apparatuses; and
wherein the radio control apparatus is configured to transmit a control signal to make remaining radio apparatuses other than the one of the plurality of radio apparatuses to be operated with the large zone cell mode switch over to a power save mode to stop forming of a cell covered by the large zone cell.

\* \* \* \* \*